US009769335B2

(12) United States Patent
Umeda et al.

(10) Patent No.: US 9,769,335 B2
(45) Date of Patent: Sep. 19, 2017

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Kiyoshi Umeda, Kawasaki (JP); Naoki Sumi, Kawasaki (JP); Tomohiro Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 14/728,265

(22) Filed: Jun. 2, 2015

(65) Prior Publication Data
US 2015/0365546 A1 Dec. 17, 2015

(30) Foreign Application Priority Data
Jun. 13, 2014 (JP) .................................. 2014-122750

(51) Int. Cl.
*H04N 5/225* (2006.01)
*H04L 29/06* (2006.01)
*H04N 1/00* (2006.01)
*H04N 101/00* (2006.01)

(52) U.S. Cl.
CPC ..... *H04N 1/00278* (2013.01); *H04N 2101/00* (2013.01); *H04N 2201/0084* (2013.01)

(58) Field of Classification Search
CPC ....... H04N 19/187; H04L 67/02; H04L 67/10; H04L 67/104; H04L 67/16; H04L 67/42; H04L 69/16; H04L 41/12
See application file for complete search history.

(56) References Cited

U.S. PATENT DOCUMENTS 7,978,909 B2  7/2011 Umeda
8,045,795 B2  10/2011 Umeda
(Continued)

FOREIGN PATENT DOCUMENTS

JP  2006-350557 A  12/2006
JP  2010-010938 A  1/2010
(Continued)

OTHER PUBLICATIONS

U.S. Appl. No. 14/727,182, filed Jun. 1, 2015, Tomohiro Suzuki, et al.
(Continued)

*Primary Examiner* — Trung Diep
(74) *Attorney, Agent, or Firm* — Fitzpatrick, Cella, Harper & Scinto

(57) ABSTRACT

An embodiment of this invention is directed to an information processing apparatus capable of performing high-speed processing and preventing memory shortage even when executing a hybrid application. According to the embodiment, an information processing apparatus that executes a program including a first program layer with an instruction set to be interpreted and executed by a processor and a second program layer with an instruction set interpreted in advance by a unit other than the processor includes the following arrangement. That is, the processor includes a plurality of interpretation units configured to interpret the first program layer. A first interpretation unit is provided in an operating system that operates in the processor, and a second interpretation unit is provided in the second program layer.

14 Claims, 17 Drawing Sheets

(56) References Cited

U.S. PATENT DOCUMENTS

| | | | |
|---|---|---|---|
| 8,374,439 B2 | 2/2013 | Hori | |
| 9,325,676 B2 * | 4/2016 | Tola, Jr. | H04L 63/0478 |
| 2006/0280362 A1 | 12/2006 | Umeda | |
| 2009/0324091 A1 | 12/2009 | Hori | |
| 2010/0303351 A1 | 12/2010 | Umeda et al. | |
| 2010/0310167 A1 | 12/2010 | Umeda | |
| 2011/0154026 A1 * | 6/2011 | Edstrom | H04L 63/0823 |
| | | | 713/158 |
| 2013/0117766 A1 * | 5/2013 | Bax | G06F 9/4405 |
| | | | 719/323 |

FOREIGN PATENT DOCUMENTS

| | | |
|---|---|---|
| JP | 2010-278708 A | 12/2010 |
| JP | 2013-080470 A | 5/2013 |

OTHER PUBLICATIONS

U.S. Appl. No. 14/743,487, filed Jun. 18, 2015, Kiyoshi Umeda, et al.
U.S. Appl. No. 14/743,459, filed Jun. 18, 2015, Naoki Sumi, et al.
U.S. Appl. No. 14/722,452, filed May 27, 2015, Maya Kurokawa, et al.
U.S. Appl. No. 14/741,973, filed Jun. 17, 2015, Masaaki Obayashi, et al.
U.S. Appl. No. 14/740,678, filed Jun. 16, 2015, Fumitaka Goto, et al.
U.S. Appl. No. 14/740,752, filed Jun. 16, 2015, Hiroyasu Kunieda, et al.
U.S. Appl. No. 14/730,985, filed Jun. 4, 2015, Masao Kato, et al.
U.S. Appl. No. 14/741,958, filed Jun. 17, 2015, Yoshinori Mizoguchi, et al.

* cited by examiner

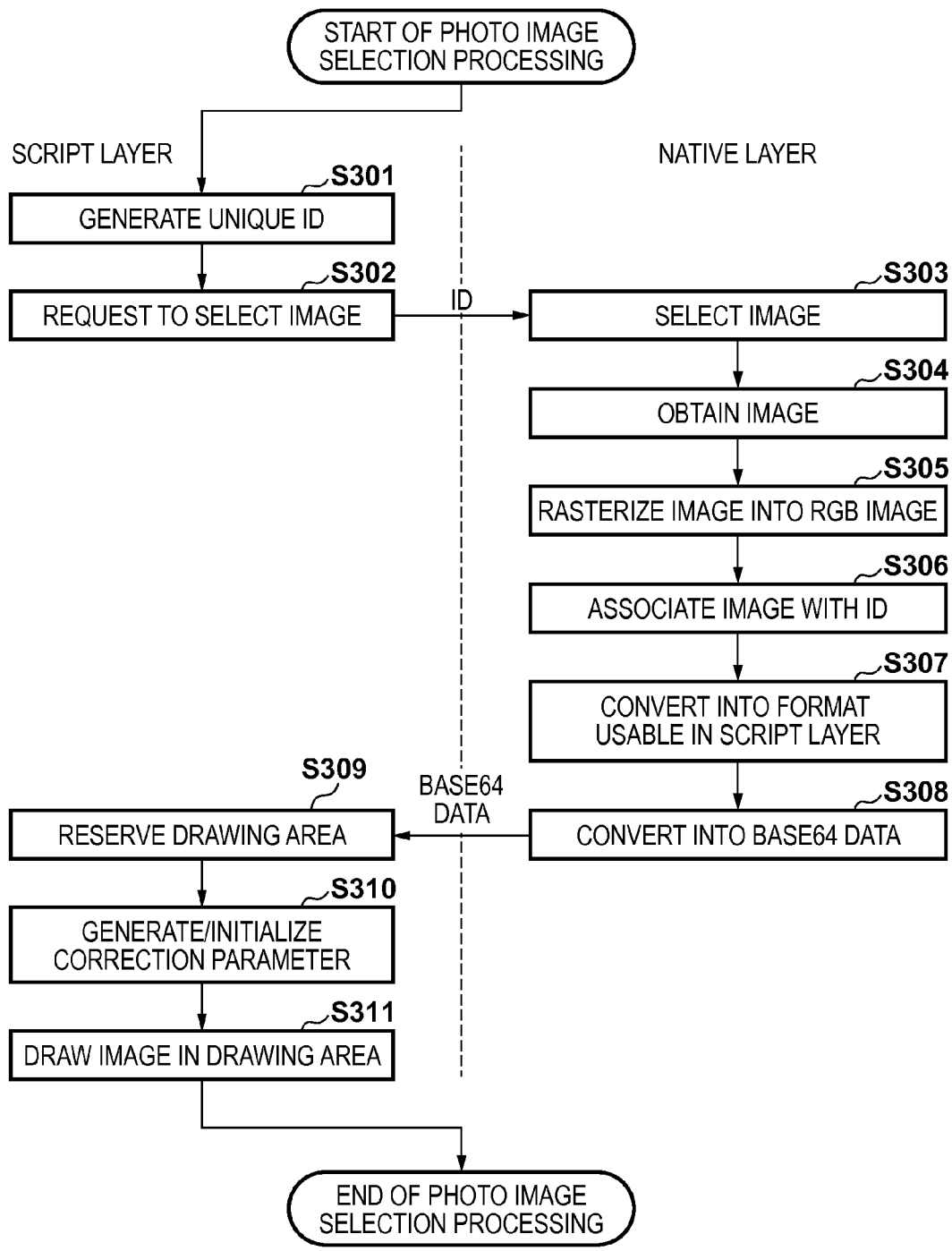
F I G. 4

F I G. 11
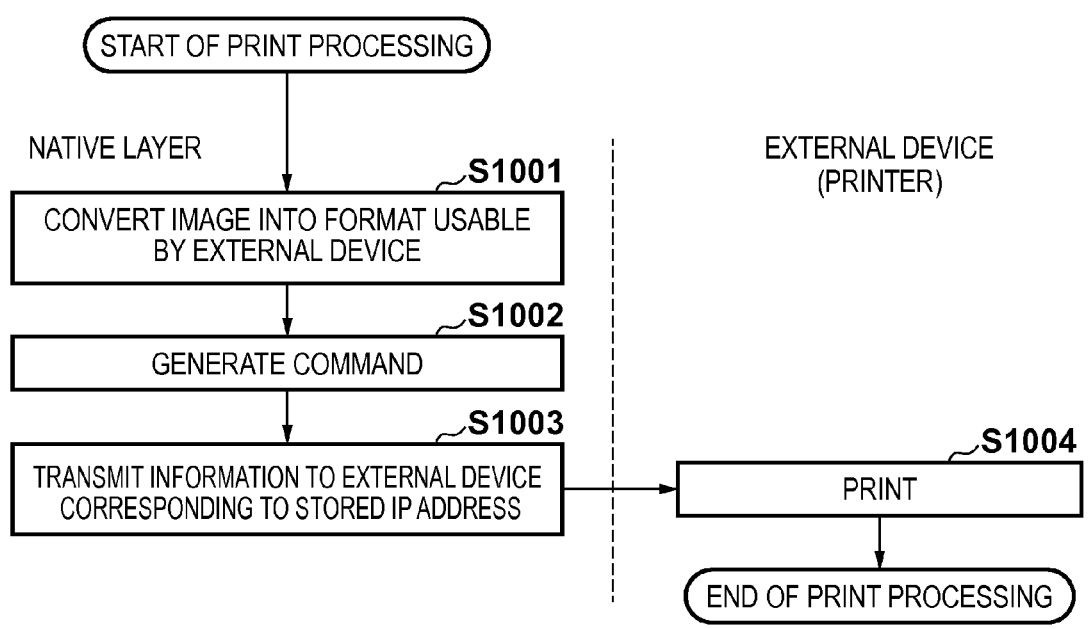

INFORMATION PROCESSING APPARATUS, INFORMATION PROCESSING METHOD, AND STORAGE MEDIUM

BACKGROUND OF THE INVENTION

Field of the Invention

The present invention relates to image processing executed by an information processing apparatus such as a mobile terminal that operates as an external device for an image output apparatus, for example, a printer.

Description of the Related Art

In recent years, multi-function mobile terminals (to be referred to as mobile computers hereinafter) incorporating a camera function have explosively become widespread, and far surpass digital cameras and conventional personal computers (to be referred to as PCs hereinafter) in sales.

Such mobile computer is basically formed from three elements, that is, hardware as the computer itself, an operating system (to be referred to as an OS hereinafter) operating on the hardware, and an application operating on the OS. By using the application, the user can use a function such as a map, mail, or browsing of a Web site on the Internet.

As examples of the form of such application operating on the mobile computer, there are mainly two application forms, that is, a native application and Web application. The features of each application form will be explained below.

The native application is developed by using a development environment and development language which are prepared for each OS. For example, the C/C++ language is used on an OS provided by company A, the Java® language is used on an OS provided by company B, and a different development language is used on an OS provided by company C. In general, the native application is compiled in advance in each development environment, and converted from a so-called high-level language understandable by a human into instruction sets such as an assembler interpretable by the CPU of the computer. Thus, the ordinary native application has an advantage that it is possible to perform an operation at high speed since the CPU directly interprets instructions.

On the other hand, the Web application indicates an application operating on a Web browser which is normally incorporated in an OS on each computer in recent years. The application is generally developed by using a language such as HTML5, CSS, or JavaScript® so that the Web browser can interpret the application. These languages are Web standard languages. Therefore, if a Web application is described using the Web standard language, it can operate in any environment where the Web browser operates.

Recently, various kinds of OSs are used as the mobile computers have become widespread. Hence, an important challenge in software development is how to develop applications that operate on the OSs in a short time and offer them to users speedily.

To solve this problem, a method called cross development is used. Cross development is a method of developing most part of an application using a common program language usable across various OSs. Because of use of the common program language, this method can largely decrease the number of man-hours in development as compared to a case where applications are developed individually for the OSs, and is known as an effective application development method.

Hence, the Web application is probably a method of solving the above-described problem. However, the Web application operates on the browser and cannot therefore be distributed from application stores run by vendors as a native application. For this reason, many developers desire a cross development method in a native application style that can be distributed from the stores.

As one of cross development methods capable of store distribution, a hybrid application as described in Japanese Patent Laid-Open No. 2013-080470 has received attention. In the hybrid application, the application itself is distributed to users as the above-described native application. All or most of user interfaces (UIs) in the hybrid application are described in a so-called Web standard language such as HTML5, CSS, or JavaScript®. That is, one application includes a native layer and a script layer using a Web standard language. When such a configuration is employed, it is possible to develop software that makes use of both the advantage of the native application and that of the Web application.

However, when applying the above-described hybrid application to a print application to print a photo or document, the following problems arise.

In a normal hybrid application, a UI portion is described in a Web standard language and held in the application as text data. This text data is called a script. This script is input to an engine used by the OS to interpret and execute held scripts when the application is activated. As a result, the UI is displayed on the screen of the mobile computer so as to be operable by the user. Here, this engine is called an interpreter.

In a photo print application, for example, a print target photo is drawn on the UI. The software needs to be designed and developed so as to allow the user to superimpose date information such as a shooting date/time and a stamp such as a pictorial symbol on the photo and print the result. In the hybrid application, drawing of print content such as date information and a stamp is also described using the Web standard language.

To print the print content, the script described using the Web standard language needs to be generally converted into high-resolution image data (so-called bitmap Data®) required by the printer engine of a printer. This process is called a rendering process. When the rendering process is performed using an interpreter held by a normal OS, the following problems arise.

(1) Decrease in Process Speed

Print content described in a Web standard language is interpreted in an interpreter and converted into high-resolution image data. To transfer the high-resolution image data to a printer, the application needs to obtain converted image data from the interpreter portion of the OS, apply format conversion, and then transfer the image data to the printer. This is because the interpreter held by the OS does not have the function of converting the image data into data interpretable by the printer. For this reason, the application needs to extract the converted image data from the interpreter. The image data is normally extracted as base64 character string data. Hence, an enormous time is necessary to convert pixel values (R, G, and B) after rendering into base64 character (character string) data in the interpreter. From the user's viewpoint of the user, time necessary for rendering means a waiting time from pressing of the print button of the UI to the start of actual printing. As a result, user friendliness considerably lowers.

(2) Shortage in Memory Necessary for Rendering for Printing

A recent mobile computer incorporates a physical RAM of several GB to dramatically improve performance. Hence, high-resolution image data of several hundred MB can be held in the memory. In the normal hybrid application, the high-resolution image data is converted into base64 data by the interpreter in the OS, and the application obtains it. At this time, however, depending on the OS used, it may be impossible to ensure a memory to hold the enormous quantity of base64 data returned from the interpreter, resulting in memory shortage.

Unless the above-described two problems are solved, it is impossible to build a print application in a hybrid application effective as a cross development method. Note that the print application is merely an example, and the same problems as described above arise when sending data from a target computer to an external device after format conversion.

SUMMARY OF THE INVENTION

Accordingly, the present invention is conceived as a response to the above-described disadvantages of the conventional art.

For example, an information processing apparatus, an information processing method, and a storage medium according to this invention are capable of performing high-speed processing and preventing memory shortage even upon executing a hybrid application.

According to one aspect of the present invention, there is provided an information processing apparatus in which an operating system is operable and which includes a program including a first program layer with an instruction set to be interpreted and executed by a processor and a second program layer with an instruction set interpreted in advance by a unit other than the processor, and a first interpretation unit configured to execute an interpretation process for output content to perform a first output process, comprising: a second interpretation unit configured to execute the interpretation process for the output content to perform a second output process, wherein the second interpretation unit is provided in the second program layer.

According to another aspect of the present invention, there is provided an information processing method of causing a processor to execute a program including a first program layer with an instruction set to be interpreted and executed by the processor and a second program layer with an instruction set interpreted in advance by a unit other than the processor, comprising: interpreting the first program layer in each of an operating system and the second program layer executed by the processor.

According to still another aspect of the present invention, there is provided a non-transitory computer readable storage medium which stores a computer program to be executed in a processor of an information processing apparatus, wherein the program includes a first program layer with an instruction set to be interpreted and executed by the processor and a second program layer with an instruction set interpreted in advance by a unit other than the processor, and the first program layer is interpreted in each of an operating system and the second program layer executed by the processor.

The invention is particularly advantageous since it is possible to provide a user-friendly environment where the processing speed is high, and no memory shortage occurs even in a case where, for example, a print application is executed in a program having a hybrid configuration.

Further features of the present invention will become apparent from the following description of exemplary embodiments (with reference to the attached drawings).

BRIEF DESCRIPTION OF THE DRAWINGS

FIG. 4 is a flowchart illustrating details of photo image selection processing.

FIG. 11 is a flowchart illustrating details of print processing.

DESCRIPTION OF THE EMBODIMENTS

Embodiments of the present invention will be described in detail below with reference to the accompanying drawings. Especially in the following embodiment, an arrangement in which a hybrid photo print application (to be described later) is operated on an information processing apparatus, various kinds of image processing are applied to an image selected by the user, and then the image is printed will be explained. Note that typical examples of the information processing apparatus include portable information terminals such as a portable telephone, smartphone, and tablet terminal.

<Description of Hardware Arrangement>

Figure 1:
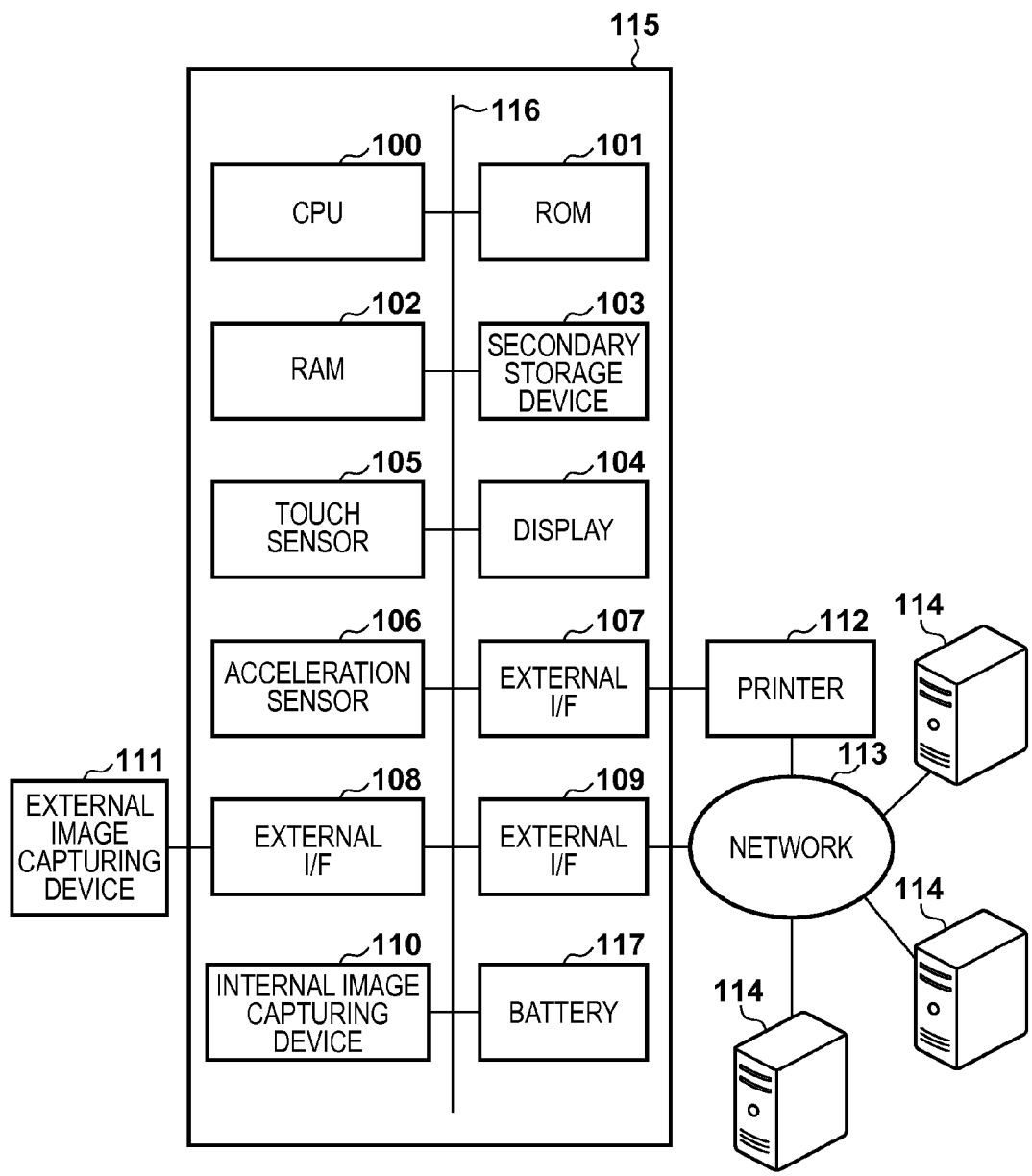
FIG. 1 is a block diagram showing the arrangement of an information processing apparatus according to an exemplary embodiment of the present invention.

FIG. 1 is a block diagram for explaining an example of the arrangement of a portable information terminal such as a smartphone or portable telephone as an information processing apparatus 115 according to an exemplary embodiment of the present invention. Referring to FIG. 1, a CPU (Central Processing Unit/Processor) 100 executes various kinds of processing (to be described below) according to a program. There is one CPU 100 in FIG. 1 but a plurality of CPUs or CPU cores may be included. A ROM 101 stores a program to be executed by the CPU 100. A RAM 102 is a memory for temporarily storing various kinds of information at the time of execution of the program by the CPU 100.

A secondary storage device 103 such as a hard disk or flash memory is a storage medium for storing various programs and data such as files and databases which hold the processing results of image analysis and the like. A display 104 displays a UI (User Interface) for accepting operations for implementing various kinds of processing, and various kinds of information such as the processing result of executed processing. The display 104 may include a touch sensor 105.

The information processing apparatus 115 may include an integrated image capturing device 110. Image data captured by the integrated image capturing device 110 undergoes predetermined image processing, and is then saved in the secondary storage device 103. Image data may be loaded from an external image capturing device 111 connected via an external I/F (interface) 108.

The information processing apparatus 115 includes an external I/F (interface) 109, and can perform communication via a network 113 such as the Internet. The information processing apparatus 115 can obtain, via the communication I/F 109, image data from servers 114 connected to the network 113.

The information processing apparatus 115 includes an acceleration sensor 106, and can obtain acceleration information about the position and attitude of the information processing apparatus 115 itself. The information processing apparatus 115 is connected to a printer 112 via an external I/F 107, and can output data such as image data. The printer 112 is also connected to the network 113, and can transmit/receive image data via the communication I/F 109.

Each of the external I/Fs 107 to 109 is an interface having at least one of a wired communication mode and wireless communication mode, and communicates with an external device (the printer 112 or server 114) in accordance with the communication mode used. For wired communication, for example, USB, Ethernet®, or the like is used. For wireless communication, a wireless LAN, NFC, Bluetooth®, infrared communication, or the like is used. If a wireless LAN is used for wireless communication, there are a mode in which apparatuses are directly connected to each other and a mode in which apparatuses are connected to each other via a relay unit such as a wireless LAN router. Although the external I/Fs 107 to 109 are illustrated separately in this figure, they may be integrally arranged.

A battery 117 supplies power necessary for the operation of the information processing apparatus 115. The various components of the information processing apparatus 115 are interconnected via a control bus/data bus 116, and the CPU 100 controls the various components via the control bus/data bus 116.

Note that in this embodiment, the information processing apparatus 115 serves as the execution location (software execution environment) of software such as a program executed by the control unit (CPU 100) of the information processing apparatus 115.

<Block Diagram of Software>

Figure 2:
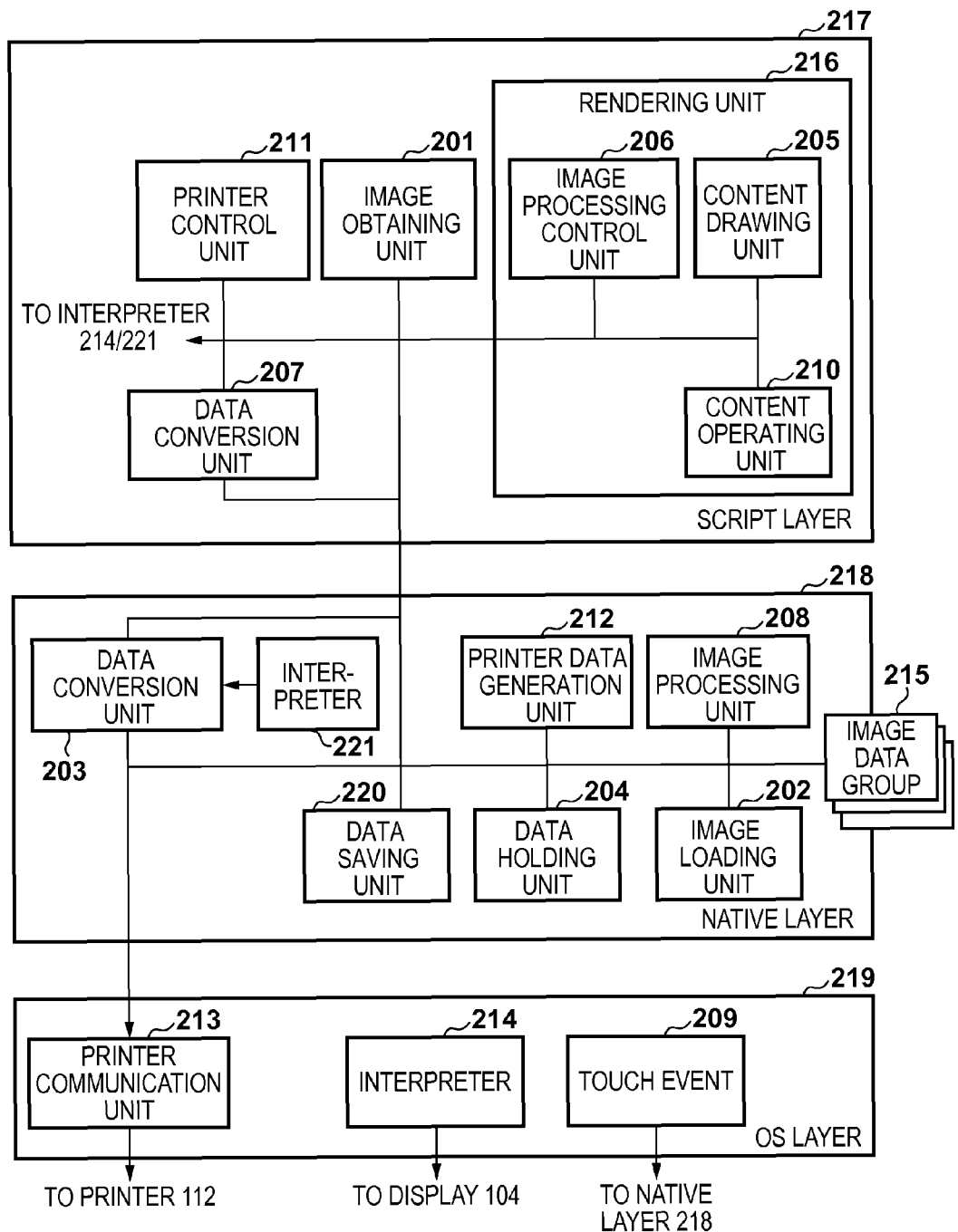
FIG. 2 is a block diagram showing the software arrangement of the information processing apparatus shown in FIG. 1.

FIG. 2 is a block diagram showing the arrangement of software programs operating on the information processing apparatus 115.

The information processing apparatus 115 executes a program of a script layer 217, native layer 218, and OS layer 219. Each layer is implemented when the CPU 100 reads out and executes the corresponding program stored in the ROM 101 or secondary storage device 103.

The script layer 217 is a program layer in which an instruction set (drawing of content, display of an image, replay of a moving image, and the like) is described by text data using a Web standard language such as HTML5, CSS3, or JavaScript®. In the script layer 217, in an application execution environment, various instruction sets of text data are interpreted and executed using a processor (for example, the CPU 100) existing in the application execution environment. In the execution form, for example, there may be a case where instruction sentences are dynamically interpreted line by line every execution operation, a case where instruction sentences are interpreted when activating an application, and a case where instruction sentences are interpreted when installing an application in the information processing apparatus 115.

Processing in the script layer 217 and its contents will be referred to as "script" hereinafter. As an example of a form in which the instructions of the script are interpreted in the information processing apparatus 115, the interpreter function included in the native layer 218 or OS layer 219 is used. Note that in this embodiment, a large portion of the UI of the application is assumed to be described in the script layer 217.

The native layer 218 is a program layer in which an instruction set interpreted (compiled) in advance in an environment other than the application execution environment is described. In the native layer 218, a code described in a high-level language such as C or C++ is compiled in advance on the server or the PC of the developer of the application into an ensemble of instructions interpretable by the CPU 100. Processing in the native layer 218 and its contents, and invocation of the function of the OS layer 219 (to be described later) from the native layer 218 will be referred to as "native" hereinafter. Note that an example of another implementation of the native layer 218 is Java. Java is a high-level language similar to C/C++, and is interpreted in advance into an intermediate code in the development environment at the time of development of the application. The interpreted intermediate code operates in the Java virtual environment of each OS. In this embodiment, such program form is also regarded as a kind of native layer 218.

The OS layer 219 corresponds to the operating system (OS) of the information processing apparatus 115. The OS layer 219 has a unique function and a role of providing the use of the hardware function to the application. The OS layer 219 includes an API. The function of the OS layer 219 can be used from the script layer 217 and native layer 218.

In this embodiment, allowing invocation of the native layer 218 from the script layer 217 will be referred to as "binding" or "bind". The native layer includes an API, and the various functions of the native layer can be used when the script invokes the API. In general, this binding function is normally included in each of various OSs.

Note that in this embodiment, the application including the script layer 217 and native layer 218 will be referred to as a hybrid application. That is, processing of the present application is executed by an information processing apparatus on which a hybrid application and an operating system can operate.

An image obtaining unit 201 of the script layer 217 requests the native layer 218 to obtain image data. At the time of the obtaining request, the image obtaining unit 201 generates a unique ID, and transmits it to the native layer 218. This ID and the image data loaded by an image loading unit 202 of the native layer 218 make a pair, and the pair is stored in a data holding unit 204 of the native layer 218. In addition, for example, a method of designating an absolute path, a method of prompting display of a dialog, or the like can be used.

The image loading unit 202 of the native layer 218 obtains the image data from an image data group 215. A method of obtaining the image data from the image data group 215 depends on the request of the image obtaining unit 201 of the script layer 217. The request method may be selected from a dialog box provided on the UI, or an image may be directly selected based on the path of a file.

A data conversion unit 203 of the native layer 218 converts data in the native layer 218 into data in a format usable in the script layer 217. On the other hand, the data conversion unit 203 also converts data sent from the script layer 217 into a format usable in the native layer 218.

A data conversion unit 207 of the script layer 217 converts data in the script layer 217 into data in a format usable in the native layer 218. On the other hand, the data conversion unit 207 also converts data sent from the native layer 218 into a format usable in the script layer 217.

The data holding unit 204 of the native layer 218 holds the image data loaded by the image loading unit 202 and image data having undergone image processing by an image processing unit 208. The held image data is rasterized into, for example, an RGB image signal, and has a format in which it is possible to immediately execute image processing.

A content drawing unit 205 of the script layer 217 describes a content to be printed by using a Web standard language. The script operated by a content operating unit 210 is also reflected on the description. The script of the content described by the content drawing unit 205 is interpreted by an interpreter 214 of the OS layer 219, and displayed on the display 104.

The image processing unit 208 of the script layer 217 performs image processing for an image designated by an image processing control unit 206. At this time, image processing to be performed is determined based on the parameter set by the image processing control unit 206. As a method of designating an image, for example, the path of the image is received from the script layer, or whole image data is received.

A touch event 209 of the OS layer 219 obtains information about a touch of the display 104. The information about a touch includes, for example, touch detection of the display 104 and touched position information. The obtained information about a touch is transmitted to the content operating unit 210 of the script layer 217 via the native layer 218.

The content operating unit 210 of the script layer 217 operates the image, for example, enlarges, moves, and rotates the image and changes the script instruction to reflect the operation.

A printer control unit 211 of the script layer 217 controls a rendering start request to a rendering unit 216, a printer detection request, display of a printer setting screen, and generation and transmission of print information. In the printer setting screen, printer settings such as a paper size, paper type, and color/monochrome are made. A printer data generation unit 212 generates printer data based on the items set in the printer setting screen.

Based on the request from the printer control unit 211, the printer data generation unit 212 of the native layer 218 generates a command and data necessary for printer communication. The data necessary for printer communication is data complying with a communication protocol, and the command is data for determining the operation of the printer such as printing or scanning.

A printer communication unit 213 of the OS layer 219 transmits the printer data received from the printer data generation unit 212 to the connected printer 112, and receives information about the printer 112 from the printer 112. The interpreter 214 of the OS layer 219 interprets/ executes an instruction generated in the script layer 217 and described in the Web standard language. For example, an instruction of drawing an image or the like is executed by the interpreter 214 and displayed on the display 104.

Another interpreter 221 exists in the native layer 218. The interpreter 221 executes an interpretation process for print content drawn in the script layer 217, renders the data to a print resolution, and outputs the image data as RGB pixel values, and details thereof will be described later. Note that the print content corresponds to an image to be printed on a print medium. Hence, the print content includes image data selected as a print target, and a stamp and date information to be added to the image data. The print content may include only image data, as a matter of course. Note that the print content may be displayed on an external device and may therefore be simply called output content.

The image data group 215 is an area which holds image data. A data saving unit 220 functions to save image data held in the data holding unit 204 in the image data group 215, as needed.

The rendering unit 216 controls the content drawing unit 205, image processing control unit 206, and content operating unit 210 to render the image data to be processed. This rendering operation includes, for example, causing the interpreter 221 of the script layer 217 to generate an image having an output resolution to the printer 112. At this time, neither the rendering result by the interpreter 221 nor the image currently generated is displayed on the display 104. The rendering result is transmitted to the data conversion unit 203 of the native layer 218, and converted into image data in a format usable by the printer 112.

<Processing Associated with User Operation>

Figure 3:
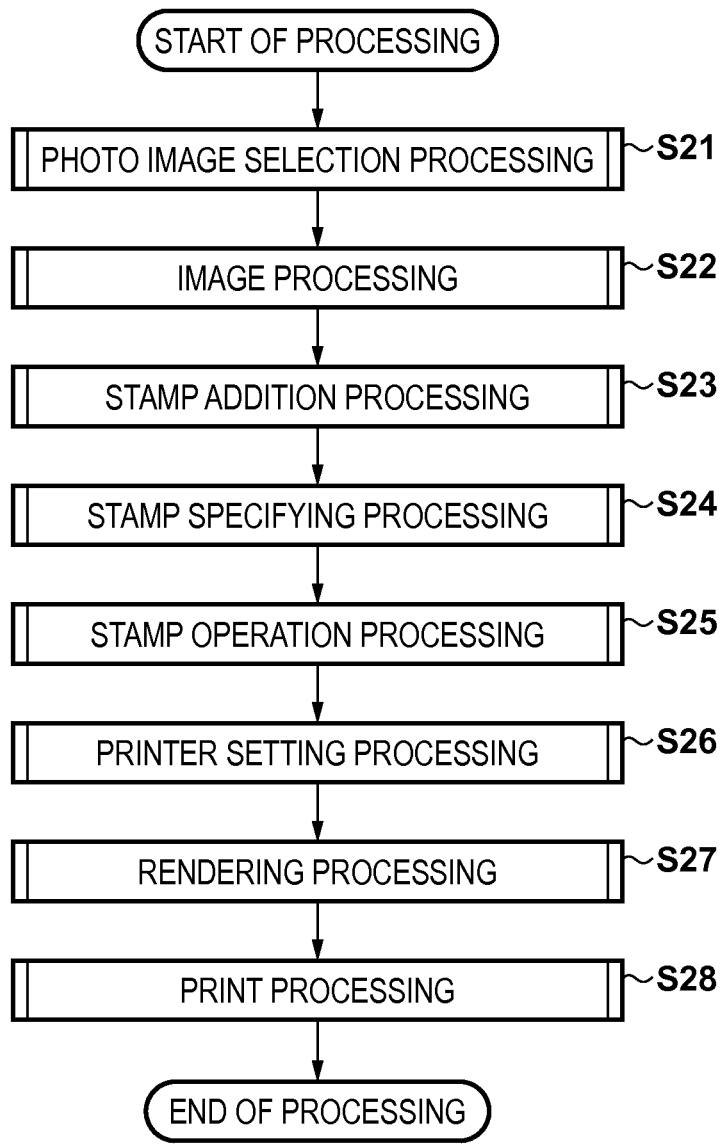
FIG. 3 is a flowchart illustrating processing associated with a user operation.

FIG. 3 is a flowchart illustrating processing including a user operation. An overview of each of processes in steps S21 to S28 will be explained with reference to FIG. 3 and details thereof will be described later. Note that the process of each step shown in the flowchart of the present application is implemented when the CPU 100 of the information processing apparatus 115 executes a program stored in the ROM 101 or secondary storage device 103. Each step shown in FIG. 3 moves according to a user operation on an application screen 1200 as a UI shown in FIG. 12. This application screen 1200 is generated by the script layer 217. An operation on the application screen 1200 is implemented via, for example, the touch sensor 105.

In step S21, upon detecting a user operation (including a touch operation, the same shall apply hereinafter) on a photo image selection button 1201 of the application screen 1200, the CPU 100 selects a desired image in accordance with the operation. After the image is selected, the CPU 100 displays the selected image on an entire drawing area 1206 of the application screen 1200.

In step S22, upon detecting a user operation on a slide bar 1202 for adjusting the brightness of the displayed image, the CPU 100 sets a correction parameter to be used for image processing in accordance with the user operation. The CPU 100 performs the image processing for the displayed image according to the set correction parameter, and displays processing contents and a processing result in the drawing area 1206.

In step S23, upon detecting a user operation on a stamp addition button 1203, the CPU 100 displays a stamp list. Upon detecting selection of a stamp by a user operation on the stamp list, the CPU 100 adds/displays the selected stamp in the drawing area 1206.

In step S24, the CPU 100 specifies a stamp in accordance with a user operation on the application screen 1200. The stamp specifying operation is performed to determine whether the stamp has been touched, based on coordinates touched by the user operation on the display 104 and the coordinates of the stamp. If the stamp has been touched, the stamp is set in an operation acceptance status. In this example, the stamp is set in the operation acceptance status in response to the user operation. The operation acceptance status will be described later.

In step S25, upon detecting a user operation on a slide bar 1204 for rotating the stamp in the operation acceptance status, the CPU 100 rotates the stamp in the operation acceptance status as a stamp operation in accordance with the user operation.

In step S26, upon detecting a user operation on a print button 1205, the CPU 100 displays a setting screen 1301 (FIG. 13) for setting information necessary for printing. The information necessary for printing includes, for example, a paper size, paper type, print quality, bordered/borderless setting item, as shown in the setting screen 1301 of FIG. 13. In addition, settable setting items such as double-sided/single-sided and monochrome/color are provided depending on the functions of the printer to be used.

In step S27, upon detecting a user operation on a setting completion button 1302 of the setting screen 1301, the CPU 100 executes rendering to convert the image displayed in the drawing area into a print resolution for output to the printer.

In step S28, the CPU 100 transmits the image converted into the print resolution to the printer 112 together with a printer control command. With the above-described process, the image selected by the user is printed by the printer 112.

Note that the processing shown in FIG. 3 is merely an example. Processing contents are not limited to them, and the processing order of the steps is not limited to this. In this embodiment, the first program layer including an instruction set to be interpreted and executed by the processor is defined as the script layer 217, and the second program layer including an instruction set compiled in advance by a unit other than the processor is defined as the native layer 218. A program including the first program layer and the second program layer implements a hybrid application. Character string data is defined as the first format and binary data is defined as the second format.

<Selection of Printer>

First, when an application for implementing the processing shown in FIG. 3 is activated by a user operation, the application performs discovery processing (not shown) of a connectable external device (the printer 112). The discovery processing indicates processing of specifying the IP address of the connectable printer 112 in the network 113 in which the information processing apparatus 115 exists.

The information processing apparatus 115 can transmit an instruction to obtain attribute information of various printers to the IP address (in some cases, a plurality of IP addresses) obtained by the discovery processing, and obtains a reply.

More specifically, in the native layer 218, the information processing apparatus 115 generates a command for obtaining information of each printer. The command is an instruction to designate the operation of the printer, and expressed in XML given by:

```
<?xml version="1.0" encoding="utf-8" ?>
<cmd xmlns:trans="http://www.trans/example/">
    <contents>
        <operation>GetInformation</operation>
    </contents>
</cmd>
```

The generated command is broadcast to network devices (for example, routers connected by Wi-Fi®) on the network in a format complying with the communication protocol of the printer. The communication method may be a Wi-Fi Direct mode or a mode of using a telephone line. The present invention, however, is not limited to them. As a result of transmitting the command, the native layer 218 receives a response from the printer. The received response is exemplarily expressed in XML given by:

```
<?xml version="1.0" encoding="utf-8" ?>
<cmd xmlns:trans="http://www.trans/example/">
    <contents>
        <PrinterName>PrinterA</PrinterName>
        <Image ProcGrp>A</Image ProcGrp>
        <ResolutionX>400</ResolutionX>
        <ResolutionY>400</ResolutionY>
    </contents>
</cmd>
```

Figure 15:
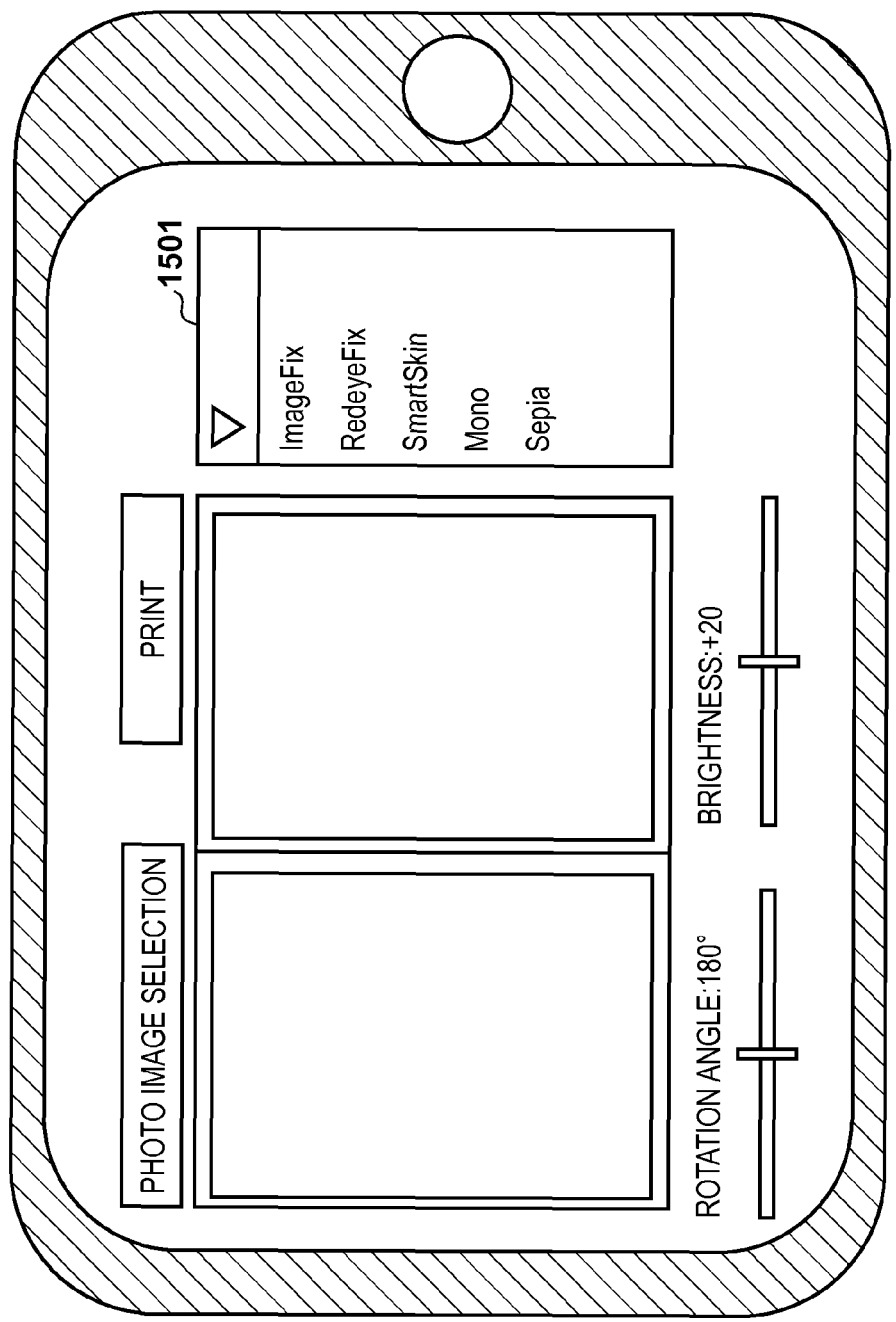
FIG. 15 is a view showing an example of an image processing function selection screen.

The simple example is shown above. By using the PrinterName tag, a printer name can be obtained. In addition, an image processing group usable by each printer can be obtained by an ImageProcGrp tag. Options to be displayed in a pull-down menu 1501 shown in FIG. 15 are determined by the image processing group. ResolutionX and ResolutionY are image resolutions required by the engine of the printer. The unit is, for example, dpi.

A model name obtained in the native layer 218 can be transmitted to the script layer 217 and displayed in a list of printers by a virtual code given by:

```
<form name="frmPrinter">
    <select name="selPrinter">
    </select>
</form>
<script type="text/javascript">
    Function fAddPrinter(PrinterName, count){
        var
sObj=document.forms["frmPrinter"].elements["selPrinter"]
];
        for (var i=0; i<count; i++){
            var idx=sObj.length;
            sObj.options[idx]=new Option(PrinterName[i]);
        }
    }
</script>
```

The select tag is a description for displaying the list. The JavaScript code described in the script tag allows addition of obtained printer names (which are stored as the PrinterName array) to the list.

Figure 14:
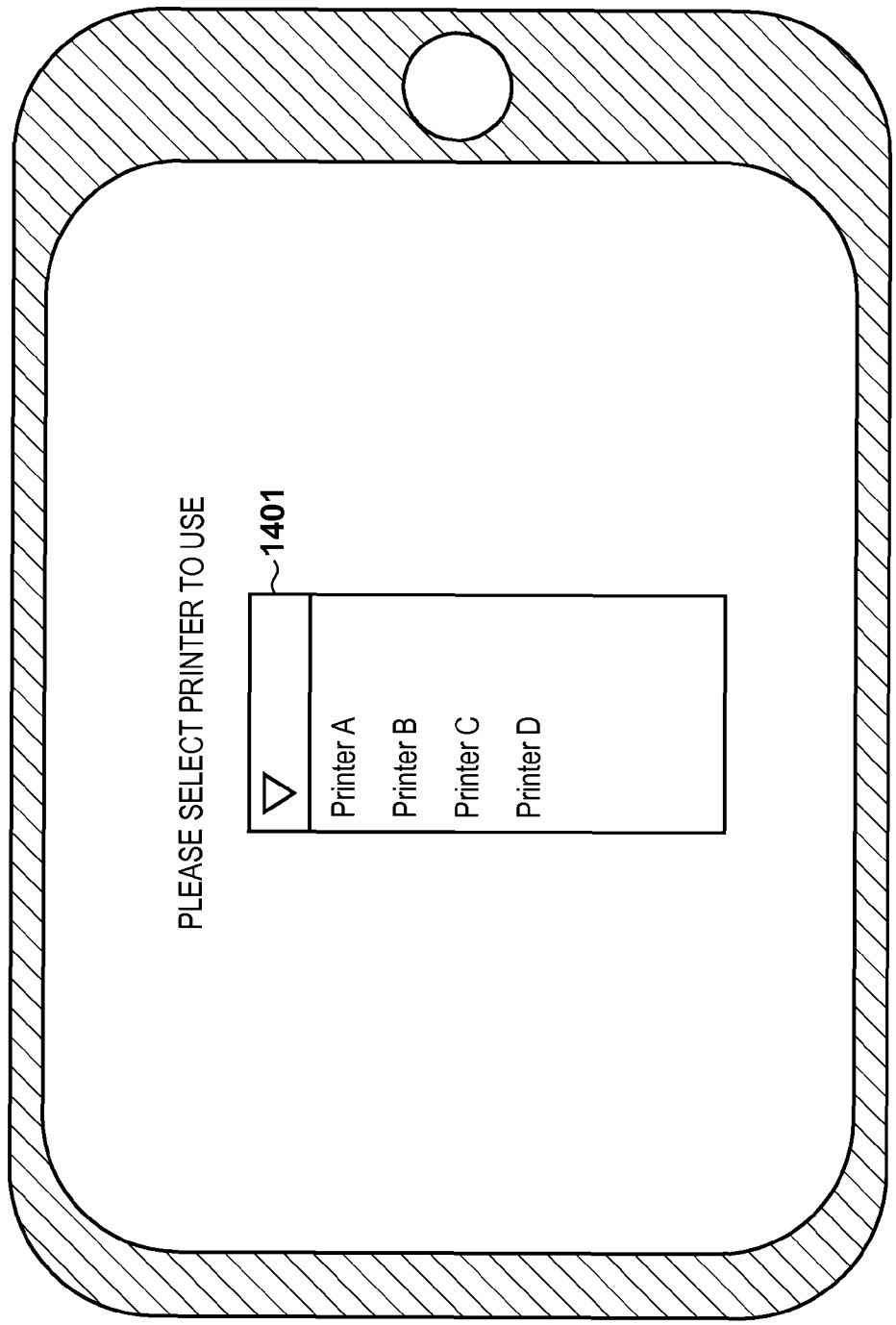
FIG. 14 is a view showing an example of a printer selection screen.

FIG. 14 shows a pull-down menu 1401 including the list of printers which is displayed on the display 104 by interpreting, by the interpreter 214, the virtual code generated in the script layer 217. When the user selects his/her intended printer, the script layer 217 can obtain an ID indicating the ordinal number of the list. After selecting the printer, the user moves to an operation of selecting a photo image.

<Details of Photo Image Selection Processing>

Figure 12:
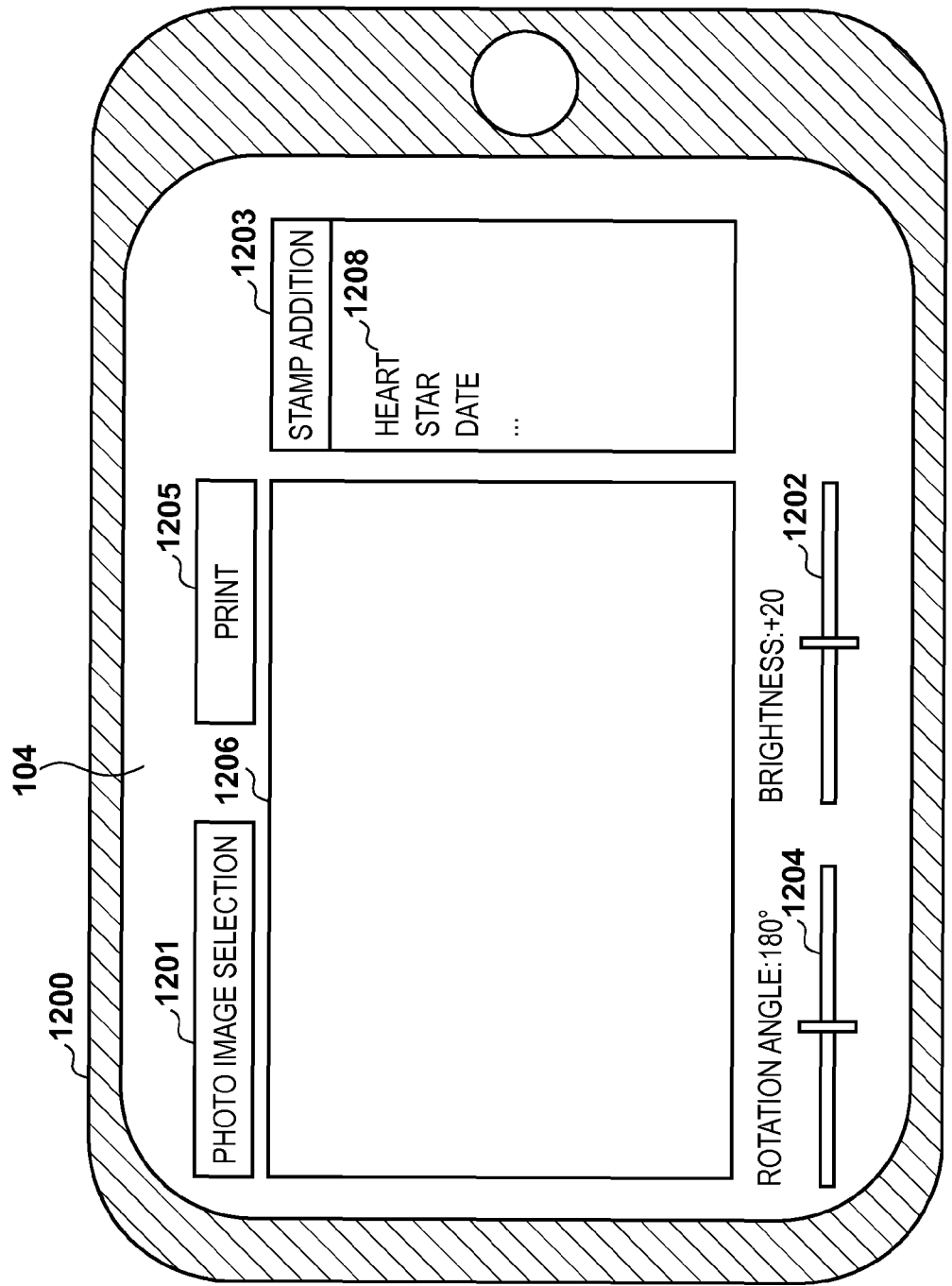
FIG. 12 is a view showing an example of an application screen.

When the user presses the photo image selection button 1201 shown in FIG. 12, step S21 starts. Details of the photo image selection processing in step S21 of FIG. 3 will be described with reference to FIG. 4. Note that steps S301, S302, and S309 to S311 are processes executed by the CPU using the program of the script layer, and steps S303 to S308 are processes executed by the CPU using the program of the native layer.

In step S301, the CPU 100 generates a unique ID. This ID may have any form such as a numerical value or character string as long as it can be transmitted from the script layer 217 to the native layer 218. In step S302, the CPU 100 requests the native layer 218 to select an image in accordance with a user operation on the photo image selection button 1201. In step S302, the ID generated in step S301 is also transmitted to the native layer 218. As a request method, the binding function is used to invoke an image selection API unique to the native layer 218 from the script layer 217. However, if the image selection API unique to the native layer cannot directly be invoked, a function capable of being directly invoked from the script layer 217 is prepared in the native layer 218, and a function for invoking the image selection API unique to the native layer is described in the function. This is a method of preparing a wrapper in advance.

In step S303, the CPU 100 displays a device-specific image selection UI on the display 104. Based on a user operation on the displayed image selection UI, the CPU 100 selects one desired image. In the image selection processing, for example, one image is selected from a folder managed in the information processing apparatus 115. The present invention, however, is not limited to this. For example, an image on the Internet or an image in a detachable storage medium may be selected, or an image shot using the integrated image capturing device 110 of the information processing apparatus 115 may be obtained.

In step S304, the CPU 100 obtains the selected image. If, for example, the selected image is in the form of an image file, the CPU 100 opens the file, and reads out its contents. In step S305, the CPU 100 rasterizes the obtained image in an RGB space. In step S306, the CPU 100 holds the rasterized RGB image in the data holding unit 204 in association with the ID obtained from the script layer 217. As an association method, for example, an object having the ID and RGB image is created to make it possible to specify the RGB image by the ID. An association method is not limited to this, and a path as the access destination of the ID and the selected image, a function or class to be executed in accordance with the ID and RGB rasterization, and the like can be used.

In step S307, the CPU 100 converts the rasterized RGB image into image data in a format usable (format supportable) in the script layer 217. In this embodiment, the converted data format is JPEG (Joint Photography Expert Group). In step S308, the CPU 100 converts the data in the JPEG format into base64 data, and transmits the base64 data to the script layer 217. This is done because the data array of the RGB image cannot be used intact in the script layer 217, and it is thus necessary to convert, in the native layer 218, the data array into a format usable in the script layer 217. Since only a character string can be used in JavaScript®, the base64 format which represents data as a character string is used in this embodiment.

In step S309, the CPU 100 receives the base64 data converted in the native layer 218, and reserves a drawing area for displaying the base64 data in the RAM 102. In this embodiment, as an example of reserving the drawing area, the HTML canvas function is used, and the API of the Context object of a canvas is used to draw an image.

In step S310, the CPU 100 generates and initializes a correction parameter. The correction parameter is an object holding parameters for determining contents of the image processing in step S22. An example of the correction parameter held by JavaScript® is:

```
var CorrectionParam = function( ){
    this.brightness = 0;
}
```

This correction parameter represents that a variable "brightness" is provided for brightness correction in a CorrectionParam object and a value of "0" is stored.

In this embodiment, for the sake of simplicity, the correction parameter only for brightness correction is used. However, parameters (the intensity of a blur filter, ON/OFF of a sepia conversion, and the like) for other correction processes may be added, as a matter of course.

In step S311, the CPU 100 designates base64 data as data to be drawn in the drawing area, thereby drawing an image in the drawing area according to the designation. More specifically, the CPU 100 transmits the base64 data designated in the script layer 217 to the interpreter 214 of the OS layer. The interpreter 214 interprets the script of the base64 data, and displays it as an image in the drawing area. An example of a sample code of reflecting the base64 data on the drawing area is:

- - - - - - - - - var base64Data=base64 data from native layer
var canvas=document.createElement("canvas");
//reserve the drawing area of an image
canvas.setAttribute("width", 100); //set the size of the drawing area
canvas.setAttribute("height", 100);
var context=canvas.getContext("2d"); //generate an object having an API to be drawn in the drawing area
var img=new Image( ); //generate an Image object
img.src=base64Data; //set the received base64 data as the URI of the image
img.onload=function( ); //start processing after the end of loading of the image
context.drawImage(img, 0, 0, img.width, img.height, 0, 0, canvas.width,
canvas.height); //draw the image in the drawing area using a method of a context object
document.getElementById("div").appendChild(canvas);
//This flowchart assumes a layer structure of many canvases.

These canvases do not freely exist everywhere, and drawing, moving, and enlargement operations are performed within a specific area (the drawing area 1206 of FIG. 12). The area is designated by "div", and each canvas is added to "div".

- - - - - - - - -

<Details of Image Processing>

When the user changes the slide bar 1202 shown in FIG. 12, step S22 starts. Details of the image processing in step S22 of FIG. 3 will be described with reference to FIG. 5. Note that steps S401 to S403, S409, and S411 are processes executed by the CPU using the program of the script layer, and steps S404 to S408, and S410 are processes executed by the CPU using the program of the native layer.

In step S401, the CPU 100 sets the correction parameter. In this example, the CPU 100 updates the value of "brightness" of the correction parameter generated in step S310 of FIG. 3 by a value set in accordance with a user operation on the slide bar 1202. In step S402, the CPU 100 activates an indicator, and displays it on the display 104. The indicator is displayed to notify the user that the processing is in progress, and is generally represented by a progress bar, a clock mark, or an image such as blink or rotation of a figure. In step S403, in the script layer 217, the CPU 100 converts the set correction parameter into a JSON character string format usable in the native layer 218. In this example, the correction parameter is in the form of an object, and cannot be used intact in the native layer 218. Thus, the CPU 100 converts the set correction parameter into a JSON character string. The CPU 100 transmits the correction parameter converted into the JSON character string to the native layer 218 together with the ID generated in step S301 of FIG. 3.

In step S404, the CPU 100 decodes the correction parameter converted into the JSON character string, thereby obtaining the correction parameter. More specifically, the correction parameter is parsed using a parser included in the OS layer 219. In the above example, after the parsing processing, "brightness" of the correction parameter is obtained.

In step S405, the CPU 100 specifies the RGB image rasterized in step S305 of FIG. 3 based on the ID obtained from the script layer 217. Note that association between the ID and the image is not limited to paring the ID and the RGB image, as described above. For example, a method of associating the path of the image with the ID may be used. There are various examples to be associated with the ID, such as an object of the native layer 218, the first address of image data, and a function of invoking the image.

In step S406, the CPU 100 determines image processing to be performed based on the obtained correction parameter, and performs the image processing for the RGB image.

In step S407, the CPU 100 converts the RGB image having undergone the image processing into image data in a format usable (format supportable) in the script layer 217. In this example, the CPU 100 converts the RGB image into data in the JPEG format, similarly to step S307 of FIG. 3. In step S408, the CPU 100 requests the script layer 217 to stop the indicator. This is implemented by invoking an indicator stop function defined in the script layer 217 from the native layer 218.

In step S409, the CPU 100 stops the indicator, and removes the indicator displayed on the display 104.

On the other hand, in step S410, the CPU 100 converts the converted data in the JPEG format into base64 data, and transmits the base64 data to the script layer 217.

In step S411, the CPU 100 receives the base64 data converted in the native layer 218, and draws an image in the drawing area reserved in step S309 of FIG. 3 in accordance with the base64 data. More specifically, the CPU 100 transmits the base64 data designated in the script layer to the interpreter 214 of the OS layer. The interpreter 214 interprets the script of the base64 data and displays it in the drawing area. With the above-described process, the image to which the image processing based on the correction parameter has been applied is displayed. In this embodiment, additionally, a list of usable image processes is displayed in the pull-down menu 1501, as shown in FIG. 15, and the user can select his/her intended process.

In the pull-down menu 1501, "ImageFix" indicates a function (face detection function) of automatically analyzing a photo image using a human face detection or scene analysis unit, and performing appropriate brightness/white balance adjustment (see Japanese Patent Laid-Open No. 2010-278708), "RedeyeFix" indicates a function (red eye detection function) of automatically detecting a red eye image from images and correcting it (see Japanese Patent Laid-Open No. 2006-350557), "SmartSkin" indicates a function of detecting a human face from a photo image, and desirably processing the skin region of the face (see Japanese Patent Laid-Open No. 2010-010938), "Mono" indicates a monochromatic processing function of performing a known monochrome conversion, and "Sepia" indicates a sepia processing function of performing a known sepia conversion. Note that the types of image processing functions are not limited to those shown in FIG. 15, and various kinds of image processing can be used in accordance with the application and purpose.

At this time, in this embodiment, a system function normally provided in the OS layer 219 is invoked from JavaScript by the binding function. A clock rate Clk [MHz] of the CPU 100 of the information processing apparatus 115 is obtained from the system function. An image processing group including usable image processing functions is specified based on the clock rate Clk using a predetermined threshold Th1. A virtual code to specify the image processing group is given by:

```
If (Clk > Th1) ImageProcGrp = "A";
    Else ImageProcGrp = "B"
```

Note that this determination is normally done in the script layer 217 when the application is activated. If the image processing group can be specified, a usable image processing display script is controlled in the script layer 217 by:

```
<form name="frmIProc">
    <select name="selIProc">
    </select>
</form>
<script type="text/javascript">
    Function fAddImageProc(Grp){
        var
sObj=document.forms["frmIProc"].elements["selIProc"];
        if(Grp="A"){
            var idx=sObj.length;
            sObj.options[idx]=new Option("ImageFix");
            var idx=sObj.length;
            sObj.options[idx]=new Option("RedEyeFix");
            var idx=sObj.length;
            sObj.options[idx]=new Option("SmartSkin");
            var idx=sObj.length;
            sObj.options[idx]=new Option("Mono");
            var idx=sObj.length;
            sObj.options[idx]=new Option("Sepia");
        }
        Else if (Grp="B"){
            var idx=sObj.length;
            sObj.options[idx]=new Option("Mono");
            var idx=sObj.length;
            sObj.options[idx]=new Option("Sepia");
        }
    }
</script>
```

In the above script operation, if it is determined that the clock rate of the CPU 100 of the information processing apparatus 115 is larger than a predetermined value (threshold), and complex image processing is executable (Grp=A), more image processing functions can be selected. On the other hand, if the clock rate of the CPU 100 of the information processing apparatus 115 is equal to or smaller than the predetermined value, only a process such as monochrome conversion or sepia conversion of light processing load can be selected.

The script is interpreted by the interpreter 214 shown in FIG. 2 and displayed on the display 104 as a function selection screen 1600 (FIG. 15), as a matter of course.

When the user selects his/her intended image processing function, it is possible to discriminate the selected image processing ID by using an HTML function. This image processing ID is transmitted to the native layer 218, and the image processing unit 208 shown in FIG. 2 applies image processing corresponding to the selected image processing function.

<Details of Stamp Addition Processing>

Figure 6:
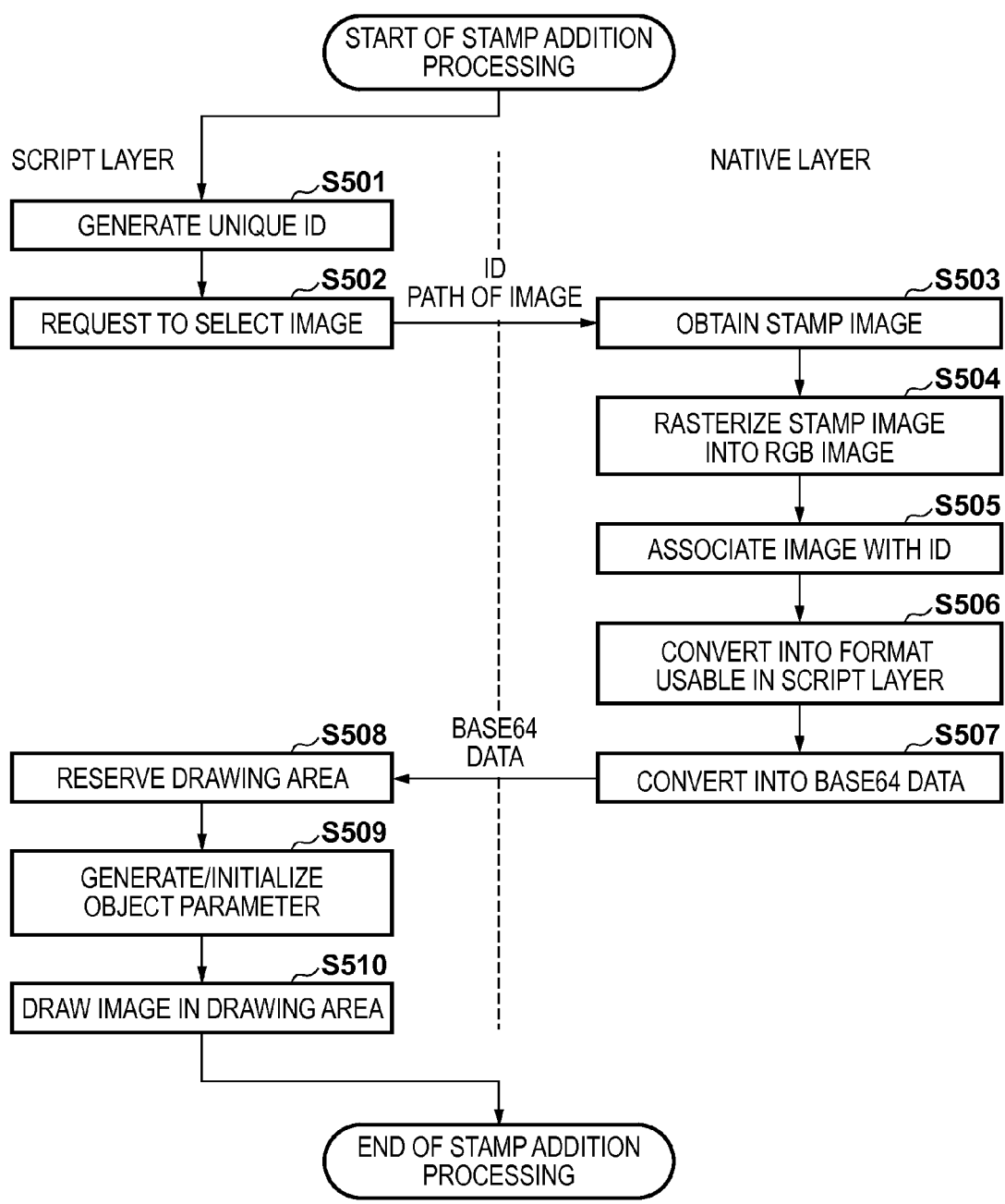
FIG. 6 is a flowchart illustrating details of stamp addition processing.

When the user presses the stamp addition button 1203 shown in FIG. 12, and selects a heart stamp 1208, the process of step S23 starts. Details of the stamp addition processing in step S23 of FIG. 3 will be described with reference to FIG. 6. In the following description, a case in which the heart stamp 1208 is selected after the stamp addition button 1203 of the application screen 1200 shown in FIG. 12 is pressed by a user operation and the stamp list is displayed will be exemplified. Note that steps S501, S502, and S508 to S510 are processes executed by the CPU using the program of the script layer, and steps S503 to S507 are processes executed by the CPU using the program of the native layer.

In step S501, the CPU 100 generates a unique ID. This ID has the same characteristic as that of the ID generated in step S301 of FIG. 3. In step S502, the CPU 100 transmits the access destination (absolute path) of an image to be used as a stamp to the native layer 218 together with the generated ID, thereby requesting to select the stamp image corresponding to the stamp.

In step S503, the CPU 100 obtains the stamp image using the absolute path of the stamp image received from the script layer 217 and a device-specific image selection API. In step S504, the CPU 100 rasterizes the obtained stamp image into an RGB image. In step S505, the CPU 100 holds the rasterized RGB image in the data holding unit 204 in association with the ID obtained from the script layer 217. An association method is the same as that in step S306 of FIG. 3. In step S506, the CPU 100 converts the rasterized RGB image into image data in a format usable (format supportable) in the script layer 217. In this conversion processing, the CPU 100 converts the RGB image into data in the JPEG format, similarly to step S307 of FIG. 3. In step S507, the CPU 100 converts the data in the JPEG format into base64 data, and transmits the base64 data to the script layer 217.

In step S508, the CPU 100 receives the base64 data converted in the native layer 218, and reserves a drawing area for displaying the base64 data in the RAM 102. In step S509, the CPU 100 generates and initializes an object parameter. Note that the object parameter is an object for holding parameters to be used, at the time of the rendering processing (to be described later in detail) in step S27 of FIG. 3, to determine the rotation angle of the stamp after the rendering processing. An example of the object parameter held by JavaScript® is:

```
var ObjectParam = function( ){
    this.theta = 0;
    this.posX = 0;
    this.posY = 0;
    this.width = 100;
    this.height = 100;
}
```

This object parameter represents that a variable name "theta" indicating the rotation angle is provided in an ObjectParam object and a value of "0" is stored in "theta". Similarly, "posX" represents an x-coordinate when the upper left corner of the drawing area is set as a reference point, "posY" represents a y-coordinate when the upper left corner of the drawing area is set as a reference point, "width" represents the lateral width of the drawing area, and "height" represents the longitudinal width of the drawing area. Note that the object parameter is minimized in this embodiment for the sake of simplicity. However, it is apparent that other parameters (translation amount, enlargement magnification, and the like) can be added and used at the time of drawing or rendering.

In step S510, the CPU 100 displays the base64 data as an image in the drawing area 1206 based on the generated object parameter. More specifically, the CPU 100 transmits the base64 data corresponding to the selected stamp to the interpreter 214 of the OS layer. The interpreter 214 interprets the script of the base64 data and displays it in the drawing area as a stamp image. Note that one stamp is selected in this embodiment for the sake of simplicity. However, a plurality of stamps can be selected, as a matter of course. In addition, an image prepared in advance is used as a stamp in this embodiment. However, a method of generating, in the script layer, a drawing product by using a Context object may be used.

<Details of Stamp Specifying Processing>

Figure 7:
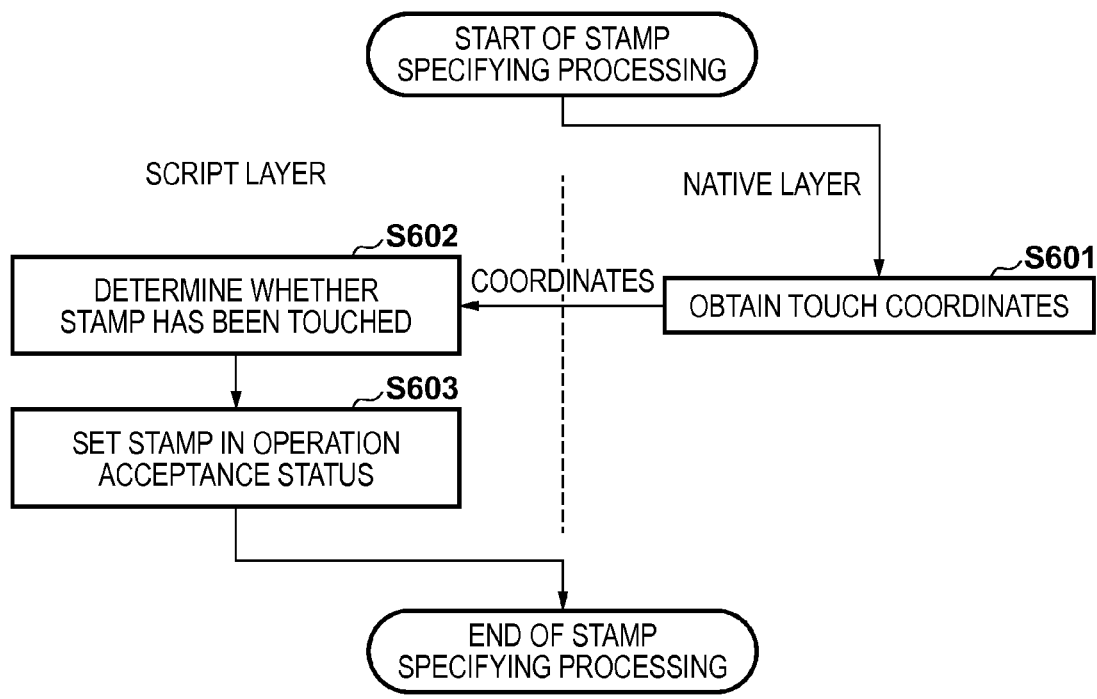
FIG. 7 is a flowchart illustrating details of stamp specifying processing.

When the user touches the display 104 shown in FIG. 1, step S24 starts. Details of the stamp specifying processing in step S24 of FIG. 3 will be described with reference to FIG. 7. Note that steps S602 and S603 are processes executed by the CPU 100 using the program of the script layer 217, and step S601 is a process executed by the CPU 100 using the program of the native layer 218.

In step S601, the CPU 100 obtains coordinates touched on the display 104, and transmits them to the script layer 217.

Figure 5:
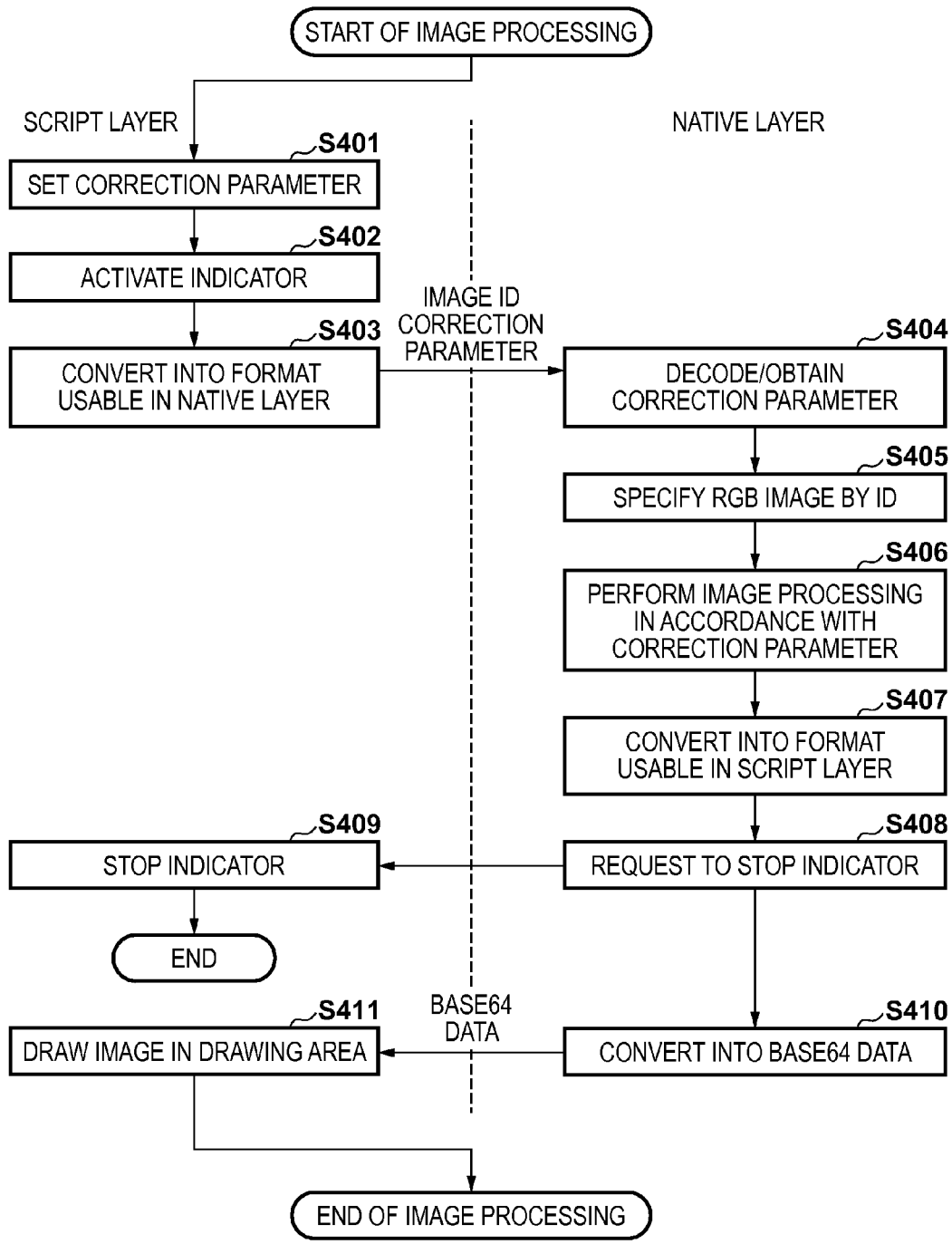
FIG. 5 is a flowchart illustrating details of image processing.

In step S602, the CPU 100 determines whether the stamp added in step S23 of FIG. 3 has been touched, based on the coordinates received from the native layer 218 and information of the object parameter generated in step S509 of FIG. 5. In the added stamp, the object parameter includes the initial values. Therefore, according to the above example of the object parameter, the stamp is drawn in an area of 100 in the x direction and 100 in the y direction with reference to (0, 0) set at the upper left corner of the drawing area 1206. If, therefore, a value obtained by subtracting the x-coordinate of the drawing area 1206 from the x-coordinate of the received coordinates (x, y) falls within the range from 0 to 100, and a value obtained by subtracting the y-coordinate of the drawing area 1206 from the y-coordinate of the received coordinates (x, y) falls within the range from 0 to 100, it can be determined that the stamp has been touched. If it is determined that the stamp has been touched, the stamp is set in the operation acceptance status in step S25 of FIG. 3. The following description will be provided by assuming that the stamp added in step S23 of FIG. 3 has been touched in step S24 of FIG. 3.

In step S603, the CPU 100 sets the stamp in the operation acceptance status in accordance with the determination result. Setting the stamp in the operation acceptance status is equivalent to temporarily storing the ID of the touched stamp as a stamp ID of interest in the script layer 217. Since images and IDs are stored in pairs in the data holding unit 204, if only an ID is grasped, it is possible to specify a unique image.

<Details of Stamp Operation Processing>

Figure 8:
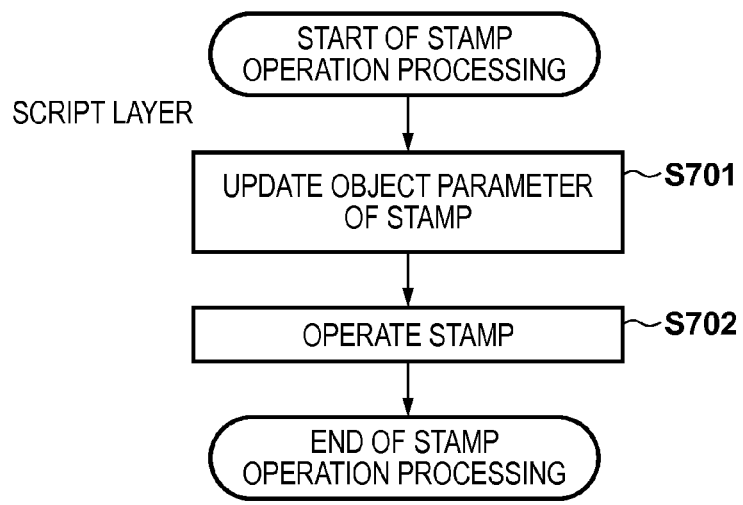
FIG. 8 is a flowchart illustrating details of stamp operation processing.

When the user touches the slide bar of the display 104, step S25 of FIG. 3 starts. Details of the stamp operation processing in step S25 of FIG. 3 will be described with reference to FIG. 8. Note that the steps shown in FIG. 8 are processes executed by the CPU 100 using the program of the script layer 217.

In step S701, the CPU 100 updates the value of "rotate" of the object parameter of the stamp. For example, the CPU 100 updates the value by a value set using the slide bar 1204 of FIG. 12 (180° in FIG. 12). In step S702, the CPU 100 re-draws the stamp set in the operation acceptance status in step S603 of FIG. 7 in the drawing area 1206 by using the object parameter. If, for example, the stamp image is drawn in an HTML canvas, it is possible to rotate the image in the canvas by using the rotate method of the Context object of the canvas.

Note that an operation of the stamp is only rotation in this embodiment. However, other operations such as resizing and translation may be possible, as a matter of course. It is also apparent that if a photo image has an object parameter, the same operation as the stamp operation is possible.

<Details of Printer Setting Processing>

When the user presses the print button 1205 shown in FIG. 12, the process of step S26 of FIG. 3 starts. Details of the printer setting processing in step S26 of FIG. 3 will be described with reference to FIG. 9. Note that steps S801 and S807 to S809 are processes executed by the CPU 100 using the program of the script layer 217, and steps S802 to S806 and S810 are processes executed by the CPU 100 using the program of the native layer 218.

In step S801, from the script layer 217, the CPU 100 requests the native layer 218 to obtain printer information as device information. This is equivalent to a request from the script layer 217 for communicating with the printer 112. As a request method, an API unique to the native layer is invoked from the script layer by using the binding function, similarly to the image selection processing. A function capable of being directly invoked from the script layer 217 or a so-called wrapper of indirectly invoking the function is prepared in advance in the native layer 218. For example, a native function GetPrinterInfo is prepared, and invoked from the script side. In this way, the native layer obtains a request to communicate with an external device from the script layer.

In general, it is impossible to directly communicate with an external device from the script layer 217 under the security restrictions. Therefore, as described above, the script layer 217 requests the native layer 218 to obtain external device information, and then communicates with an external device via the native layer 218. The native layer 218 has a function of communicating with an external device (for example, the printer 112) via the OS layer 219.

In step S802, the CPU 100 transmits a printer information obtaining command. The printer information obtaining command is transmitted by a method such as broadcast or multicast using a protocol such as Bonjour®. A printer returns a response to the transmission result of step S802. In step S803, the CPU 100 receives the response from the printer, thereby detecting the printer. In step S804, the CPU 100 stores the IP address of the printer that has responded. For example, a printer connected by the same wireless LAN router is detected.

In step S805, the CPU 100 requests the IP address of the printer that has responded to provide printer information. If a plurality of printers have responded, the CPU 100 requests all printers to provide information. To do this, the CPU 100 generates, in the native layer, a command to obtain the information of each printer. The command is an instruction to designate the operation of the printer, and its example is expressed in XML given by:

```
01:  <?xml version="1.0" encoding="utf-8" ?>
02:  <cmd xmlns:trans="http://www.xxxx/yyyyy/">
03:      <contents>
04:          <operation>GetInformation</operation>
05:      </contents>
06:  </cmd>
```

A numerical value such as "01:" written in the left portion of each line is a line number added for the descriptive purpose, and is not described in actual text data in the XML format.

The first line indicates a header representing that the command is described in the XML format.

On the second line, "cmd" indicates the start of the command. A name space is designated by "xmlns" to designate the definition of interpretation of the command. Note that </cmd> on the sixth line indicates the end of the command.

The third line indicates a declaration of describing contents thereafter, and the fifth line indicates the end of the contents.

On the fourth line, an instruction to be requested is described. An actual instruction word exists between <operation> and </operation>. An instruction word "GetInformation" is an instruction of obtaining information of a printer as an external device. For example, it is requested to provide capability information such as a paper type, a size, the presence/absence of a marginless printing function, and the print quality supported by the printer.

Note that a printer information obtaining command may be generated by, for example, loading permanent text stored in advance in the ROM 101. Also, the format is not limited to a text format such as XML, and the command may be described in the binary format, and communicated by a protocol complying with the format. The generated printer information obtaining command is transmitted to the printer 112 via the printer communication unit 213 in a format complying with a communication protocol such as HTTP supported by the printer.

A communication method is not limited to this. Connection using Wi-Fi® Direct, Bluetooth®, infrared communication, telephone line, wired LAN, or USB may be used. By performing communication by a protocol complying with the method, it is possible to obtain the same effects.

Figure 9:
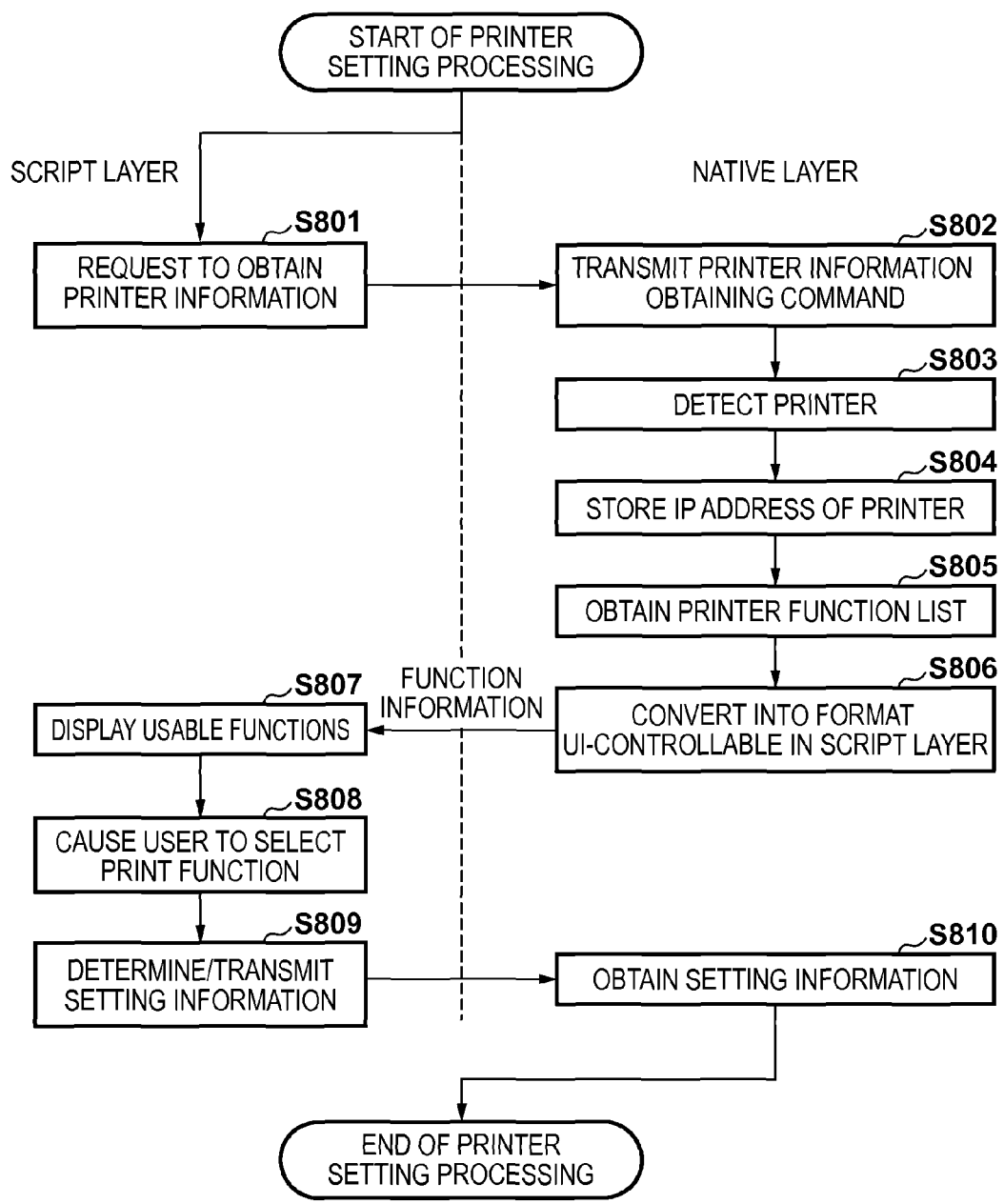
FIG. 9 is a flowchart illustrating details of printer setting processing.

Referring to FIG. 9, a command is generated in the native layer 218. However, even if a command is generated in the script layer 217, it is possible to obtain the same effects. In this case, for example, a command including the above instruction sentence in the XML format is created in the script layer 217, and transferred to the native layer 218. Upon receiving the instruction sentence, the native layer 218 transmits the command to the printer 112 in a format complying with a communication protocol.

Upon receiving the command from the information processing apparatus 115, the printer 112 transmits the printer information as device information in the XML format to the information processing apparatus 115 according to the communication protocol. In step S805, the native layer 218 obtains a printer function from the printer. An example of the printer information is given by:

```
01:  <?xml version="1.0" encoding="utf-8" ?>
02:  <cmd xmlns:trans="http://www.xxxx/yyyyy/">
03:      <contents>
04:          <device id="Printer001" />
```

```
05:        <mode = 1>
06:            <media>GlossyPaper</media>
07:            <size>A4</size>
08:            <quality>1</quality>
09:            <border>no</border>
10:        </mode>
11:        <mode = 2>
            ...
        </mode>
        <mode = 3>
            ...
        </mode>
        ...
    </contents>
</cmd>
```

The first line indicates a header representing that the information is described in the XML format. On the second line, "cmd" indicates the start of the command. A name space is designated by "xmlns" to designate the definition of interpretation of the command. Note that </cmd> on the last line indicates the end of the command.

The third line indicates a declaration of describing contents thereafter, and the contents are continuously described up to </contents>. The fourth line indicates a device ID. In this example, the model name of the printer 112 is "Printer001". On the fifth line and subsequent lines, the respective modes of the printer 112 are described. Information in one mode is described between <mode> and </mode>. On the fifth line, the number of a mode is 1. After that, <media> describes the type of printing paper, <size> describes a paper size, <quality> describes the print quality, and <border> describes bordered/borderless information.

On the 11th line and subsequent lines, information about mode 2 as another mode is described. In this way, the model name of the printer 112 and all the modes supported by the printer are described in the XML data.

Note that a method of describing printer information is not limited to this. The printer information may be described in another format such as a binary format or a text format which is not a tag format. In the above example, the information of the print function of the printer is transferred. However, the present invention is not limited to this. For example, information about image processing and analysis processing processable by the printer, the presence/absence of a silent print mode, the presence/absence of the use of a memory card, and a status such as the remaining ink amount may be transferred. Examples of image processing are color conversion such as monochrome conversion, sepia conversion, and chroma enhancement, multiple image layout, white balance correction, noise reduction, and processing of automatically correcting a photo to desirable colors and brightness.

In step S805, the CPU 100 receives the printer information from the printer 112. In the native layer, the CPU 100 obtains, from the received printer information, a printer function list including terms of the type and size of printing paper, the print quality, and bordered/borderless and a term count in each of all the modes of the printer 112.

In step S806, the CPU 100 converts the received printer information into a format interpretable in the script layer 217, and transmits the converted information to the script layer 217. That is, the CPU 100 transfers the information obtained by communication with the printer 112 to the script layer 217. More specifically, the printer information can be transmitted in the XML format just as it has been received or transmitted after converted into a text format without tag.

Every time a specific native function is invoked from the script layer 217, information may be obtained as its return value. Alternatively, a mode to be obtained or the like may be given to the native function as an argument, and information may be obtains as its return value. In addition, the information may be transferred by using the above-described JSON character string, or transferred by a character string such as base64 by using the data conversion units 207 and 203.

In step S807, the CPU 100 forms a setting screen (FIG. 13) including functions usable by the printer 112 based on the printer information received from the native layer 218, and displays the setting screen. This is called display control in this embodiment. If there are a plurality of connectable printers, a display screen for displaying printer names and prompting the user to select a printer for printing is generated (display contents are controlled). Note that a printer selection method is not limited to this, and a method of selecting a printer which responds earliest, a method of selecting a printer having more functions, a method of selecting a printer with not so many print jobs, or the like may be used.

As described above, the CPU 100 displays the setting screen 1301 (FIG. 13) for prompting the user to select functions usable by the printer, such as the type and size of printing paper, the print quality, and bordered/borderless. As an example of a method of forming a setting screen, a sample of an HTML description is given by:

```
<!DOCTYPE html>
    <head>
        <title>print setting</title>
        <script>
            <!-- paper size -->
            var PaperSizeNum = GetPaperSizeNum( );
            var p = document.getElementById("PaperList");
            var i;
            for(i=0; i<PaperSizeNum; i++){
                p.options[i] = new Option(GetPaperSize(i),
GetPaperSize(i));
            }
            <!-- paper type -->
            var MediaTypeNum = GetMediaTypeNum( );
            var m = document.getElementById("MediaList");
            var j;
            for(j=0; j<MediaTypeNum; j++){
                m.options[i] = new Option(GetMediaTypeT(j),
GetMediaTypeV(j));
            }
            <!-- print quality -->
            var QualityNum = GetQualityNum( );
            var q = document.getElementById("QualityList");
            var k;
            for(k=0; k< QualityNum; k++){
                q.options[i] = new Option(GetQualityT(k),
GetQualityV(k));
            }
            <!-- bordered/borderless -->
            var BorderNum = GetBorderNum( );
            var b = document.getElementById("BorderList");
            var l;
            for(l=0; l<BorderNum; l++){
                b.options[i] = new Option(GetBorderT(l),
GetBorderV(l));
            }
            <!-- print function -->
            function printer( ) {
            SetPrint(document.getElementById("PaperList").value,
                    document.getElementById("MediaList").value,
                    document.getElementById("QualityList").value,
                    document.getElementById("BorderList").value);
            }
        </script>
    </head>
```

-continued

```
    <!-- display unit -->
    <body>
        paper size <select id="PaperList"></select><br/>
        paper type <select id="MediaList"></select><br/>
        print quality <select
id="QualityList"></select><br/>
        bordered/borderless <select
id="BorderList"></select><br/>
        <br/>
    <button id="btn1" onclick="printer( )">setting
completion</button>
    </body>
</html>
```

In the above sample, GetPaperSizeNum( ), GetMediaTypeNum( ), GetQualityNum( ), and GetBorderNum( ) are native functions, and each native function has a function of obtaining an item count. For example, paper sizes supported by the printer are A4, A5, B5, and L size, GetPaperSizeNum( ) returns 4.

Also, GetPaperSizeT(n), GetMediaTypeT(n), GetQualityT(n), and GetBorderT(n) are native functions, and each function returns the nth character string corresponding to the argument n. For example, the return value of GetPaperSize (0) as a function of returning text of the paper size is "A4", and the return value of GetPaperSize(1) is "A5". These values are extracted by the native function from the printer information received from the printer.

GetPaperSizeV(n), GetMediaTypeV(n), GetQualityV(n), and GetBorderV(n) are also native functions, and each function returns the nth value corresponding to the argument n. For example, the return value of GetMediaTypeT(0) as a function of returning text of the paper type uses words, for example, "glossy paper" to be displayed and presented to the user. On the other hand, the return value of GetPaperTypeV (0) uses words, for example, "GlossyPaper" interpretable by a printer. These words are determined in the native layer in association with the information sent from the printer. For example, if a value extracted from information sent from the printer is "GlossyPaper", the text to be displayed is determined as "glossy paper". As a determination method, the native layer holds a correspondence table in advance and determines texts based on the correspondence table.

Note that as an example, the paper size, paper type, print quality, and bordered/borderless settings are made. The present invention, however, is not limited to this. As another example, other setting items such as double-sided/single-sided, color/monochrome, and ON/OFF of image correction are set, as a matter of course. Furthermore, not only the print function but also information about image processing and analysis processing processable by the printer, the presence/absence of a silent mode, the presence/absence of the use of a memory card, and a status such as the remaining ink amount may be displayed.

Figure 13:
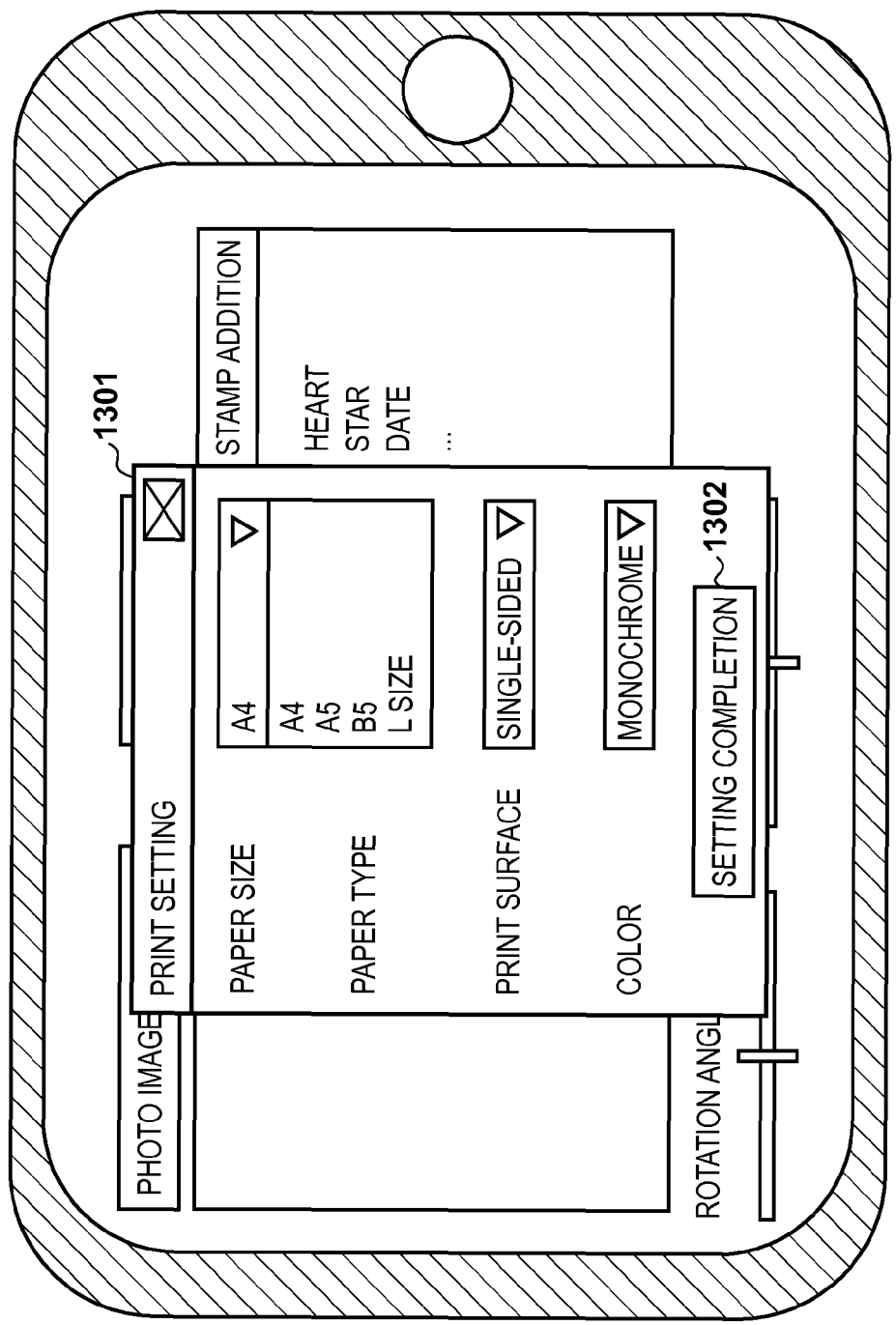
FIG. 13 is a view showing an example of a setting screen.

In step S808, the CPU 100 selects a function to be set in the printer based on a user operation on the setting screen 1301. The setting screen 1301 shown in FIG. 13 is an example in which the HTML of the above example is displayed on the display 104 using the rendering unit 216. The printer information is requested via the native layer 218, thereby forming the setting screen 1301 based on the information obtained from the printer information by using the above native function. Note that the HTML can be formed either in the script layer 217 or in the native layer 218.

Furthermore, each setting item such as the paper size shown in FIG. 13 is provided as a pull-down menu, and each item can be selected by a user operation. The setting screen 1301 indicates a state in which a list of selectable items is displayed as a setting item of a paper size by a pull-down menu, and a paper size such as A4 or A5 can be selected by a user operation.

In step S809, upon detecting a user operation on the setting completion button 1302, the CPU 100 creates setting information including a setting item selected by the user operation and transmits the setting information to the native layer 218. In the above example of the HTML description, SetPrint( ) is also a native function having the binding function. In the above example, SetPrint( ) is used to transfer the paper size, paper type, print quality, and bordered/borderless settings as a character string to the native layer 218.

In step S810, the CPU 100 receives the setting information from the script layer 217 by the binding function. In the native layer 218, a print command is generated later based on the received setting information, print target image data, and the image data of the stamp according to the communication protocol of the printer 112. The print command is transmitted to the printer 112 via the printer communication unit 213.

<Details of Rendering Processing>

When the user presses the setting completion button 1302 of the setting screen 1301 shown in FIG. 13, rendering processing in step S27 of FIG. 3 starts. In this embodiment, rendering processing for printing is executed by the interpreter 221 provided in the native layer shown in FIG. 2. Note that the interpreter (second interpreter) 221 is a program module capable of interpreting and drawing/executing a Web standard language, like the interpreter (first interpreter) 214 provided in the OS layer 219.

Figure 10:
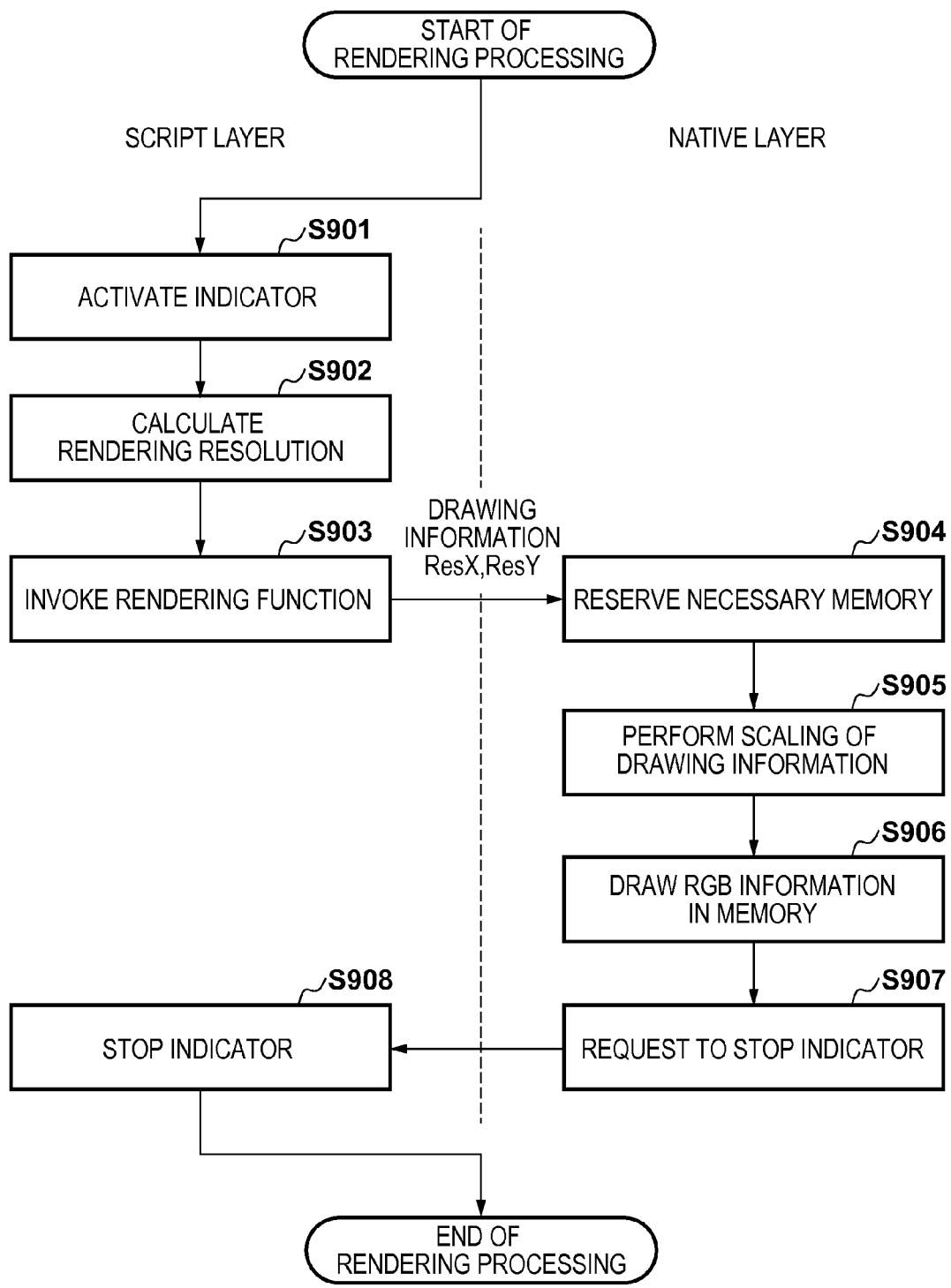
FIG. 10 is a flowchart illustrating details of rendering processing.

Details of the rendering processing in step S27 of FIG. 3 will be described with reference to FIG. 10. Note that steps S901 to S903 and S908 are processes executed by the CPU 100 using the program of the script layer 217, and steps S904 to S907 are processes executed by the CPU 100 using the program of the native layer 218. More specifically, steps S904 to S906 of FIG. 10 are executed by the interpreter 221.

In step S901, the CPU 100 activates an indicator. The indicator is a UI (User Interface) display representing that some processing is in progress in the application. An example of the indicator is a progress bar. Since the rendering processing normally takes a time of several seconds to several tens of seconds, displaying such an indicator is essential.

In step S902, resolution information necessary for rendering is calculated from the paper type information selected by the user in step S808 and the value of "ResolutionX" and the value of "ResolutionY" obtained by "GetInformation". For example, in this application, the script layer 217 holds the following correspondence table.

TABLE 1

| Paper size | PaperH [mm] | PaperW [mm] |
|---|---|---|
| 4 × 6 | 101.6 | 152.4 |
| A4 | 297 | 210 |
| L size | 89 | 127 |

In Table 1, PaperH represents the paper height, and PaperW represents the paper width. Pieces of resolution information ResX and ResY (the unit is "pixels") necessary for rendering can be calculated by $ResX = PaperH/25.4 \times ResolutionX$ $ResY = PaperW/25.4 \times ResolutionY$ When the calculation of the values ends in step S902, the CPU 100 invokes the API of the interpreter 221 prepared in the native layer 218 by the binding function and transfers necessary information to the API in step S903. More specifically, the calculated resolution information and script information of drawing of the print content (description information by canvas) are transferred as the necessary information.

In step S904, the CPU 100 reserves, in the RAM 102, an image area necessary for the rendering processing by the interpreter 221 of the native layer 218. A size M of the memory to be reserved is given by $$M = ResX \times ResY \times \text{number of elements[bytes]}$$

where the number of elements is the number of color components per pixel, which is normally 3 because RGB components are held.

In step S905, the CPU 100 calculates enlargement ratios ExpX and ExpY to convert drawing information of the print contents into a needed resolution by $$ExpX = ResX/CanX$$

$$ExpY = ResY/CanY$$

where CanX and CanY represent the sizes of a Canvas area (the unit is "pixels") originally prepared for display.

After the enlargement ratio calculation, the CPU 100 performs scaling of the drawing information using the values in step S905. More specifically, scaling is performed using a scale function prepared in Context of Canvas.

In step S906, the CPU 100 executes the scaling processing. As a result, the rendering information is interpreted, and enlargement rendering is performed in the area of the RAM 102 reserved in step S904. Image information can thus be obtained as the pixel values of RGB components.

When the rendering processing has succeeded, the CPU 100 issues an indicator stop request to the script layer 217 in step S907.

In step S908, the CPU 100 stops the indicator in the script layer 217 and removes it from the display 104.

<Details of Print Processing>

Print processing is executed in step S28 of FIG. 3 using the rendered image data. In fact, the process of step S28 starts as soon as the process of step S906 of FIG. 10 ends. Details of the print processing in step S28 of FIG. 3 will be described with reference to FIG. 11. Note that the steps shown in FIG. 11 are processes executed by the CPU using the program of the native layer.

In step S1001, based on the image information (RGB values) rendered in step S906, the CPU 100 converts the RGB values into a format usable by the printer 112. Formats usable by the printer include not only RGB, JPEG, and CMYK but also an original format of a printer vendor such as PDF. Any of these formats can be used here.

In step S1002, the CPU 100 generates a command to be transmitted to the printer 112 based on the setting information and the image data converted in step S1001. In step S1003, the CPU 100 uses the printer communication unit 213 to transmit the command generated in step S1002 to the printer 112 corresponding to the IP address stored in step S804 in accordance with the communication protocol usable by the printer.

In step S1004, the printer 112 executes printing according to the command received from the information processing apparatus 115.

Hence, according to the above-described embodiment, the first interpreter provided by the OS is used as usual to perform rendering processing of rendering/displaying the print content and the UI of the application. On the other hand, rendering processing for printing is executed using the second interpreter different from the interpreter provided by the OS. The second interpreter operates in the native layer. High-resolution image data (bitmap data) output from the native layer is sent to the printer without being converted into text data. It is therefore possible to save the time necessary to convert the high-resolution image data (bitmap data) into base64 data and execute processing at a high speed.

In addition, since the image data is directly transmitted from the native layer to the printer, memory shortage caused by the configuration of the OS can be avoided.

Note that in the embodiment, as a method of drawing contents (a photo image or stamp image), the canvas function of JavaScript has been exemplified. A method of drawing contents is not limited to this. For example, it is possible to draw contents using SVG (Scalable Vector Graphics). In this case, the interpreter 221 interprets SVG but can implement the present invention in a similar manner. There exist many related art literatures about SVG, and a detailed description thereof will be omitted here.

In the above-described embodiment, the printer is selected after the application is activated. However, the present invention is not limited to this. For example, a printer may be set in the process of print settings, and an information obtaining command by XML may be transmitted to the printer.

The pieces of information shown in Table 1 may be held in the application in advance, or included in the printer main body and obtained by a "GetInformation" command. Alternatively, the information may be held in the server 114 as shown in FIG. 1, and the information as shown in Table 1 may be obtained from the server in accordance with the standard communication protocol of the web.

In the above-described embodiment, an example in which the native layer includes two interpreters configured to interpret/execute an instruction of the script layer has been explained. However, the present invention is not limited to this. For example, a plurality of interpreters may be provided in the native layer 218 and used in accordance with the language used for a UI or the purpose of printing.

Another Embodiment

In the above-described embodiment, the OS installed in the information processing apparatus is not a specific OS. A case where a specific OS, that is, an Android® OS is installed will be described here.

Figure 16:
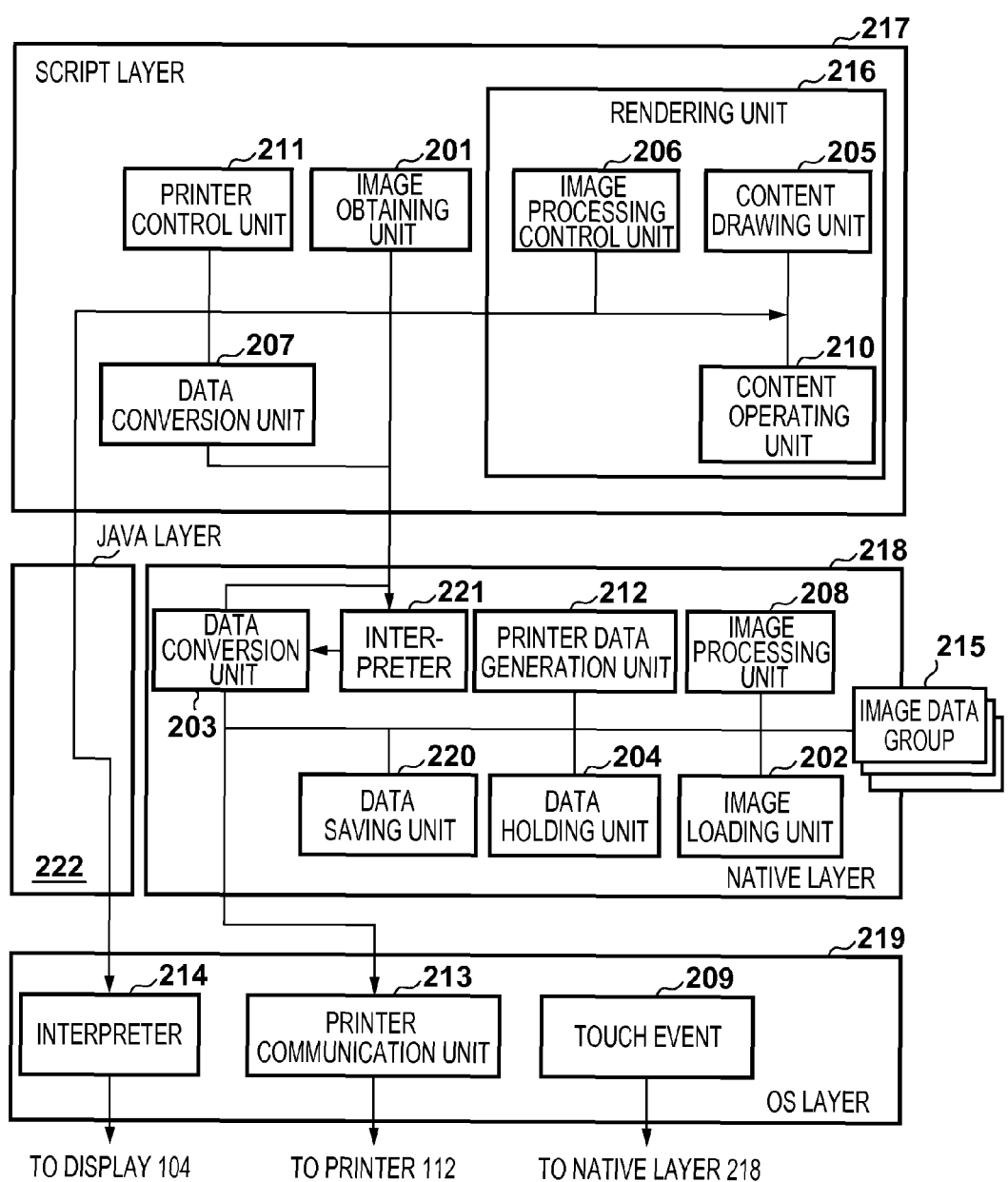
FIG. 16 is a block diagram showing a software arrangement according to another embodiment.

FIG. 16 is a block diagram showing the software arrangement of an information processing apparatus in which the Android® OS operates. Note that the same reference numerals as in FIG. 2 denote the same constituent elements in FIG. 16, and a description thereof will be omitted. An arrangement unique to the Android® OS will be explained here.

As shown in FIG. 16, in the Android® OS, a program layer (to be referred to as a Java layer hereinafter) 222 configured by Java® is provided between a script layer 217 and an OS layer 219 in addition to a native layer 218. In the native layer 218, program codes originally described in the C/C++ language are interpreted to a machine language by Native Development Kit® (=NDK).

In this software arrangement, as shown in FIG. 16, content drawn by the content drawing unit 205 is input to the interpreter 214 via the Java layer 222, interpreted by the interpreter 214, and drawn. As pointed out in the section of the description of the related art of this specification, when performing rendering for printing by the interpreter provided in the OS layer, it is necessary to cause the Java layer 222 to obtain image data in the base64 data format obtained by the rendering, convert it into image data, and then transmit the data to a printer.

In general, however, the total capacity of the memory that can be handled in the Java layer 222 is limited to a small amount as compared to the native layer 218 using NDK. For this reason, if a large amount of high-resolution image data for printing is generated by the interpreter 214 of the OS layer and extracted by the Java layer 222, memory shortage occurs in the Java layer 222 at high possibility.

To prevent this, in this embodiment, when printing such content, the drawing script of the content is input to the interpreter 221 provided in the native layer 218, and high-resolution image data for printing is generated in the native layer, as shown n FIG. 16. As a result, the generated image data is converted into an intended data format by the data conversion unit 203 and transmitted to the printer 112 via the printer communication unit 213.

Hence, according to the above-described embodiment, even in the information processing apparatus in which a specific OS (Android® OS) is installed, image data is directly transmitted from the native layer to the printer. This can avoid memory shortage in the Java layer caused by the configuration of the OS.

Still Another Embodiment

In the above embodiment, an example in which the script provided in the native layer is used upon rendering processing for printing has been described. A case where the script is used to display a print preview will be described here.

Figure 17:
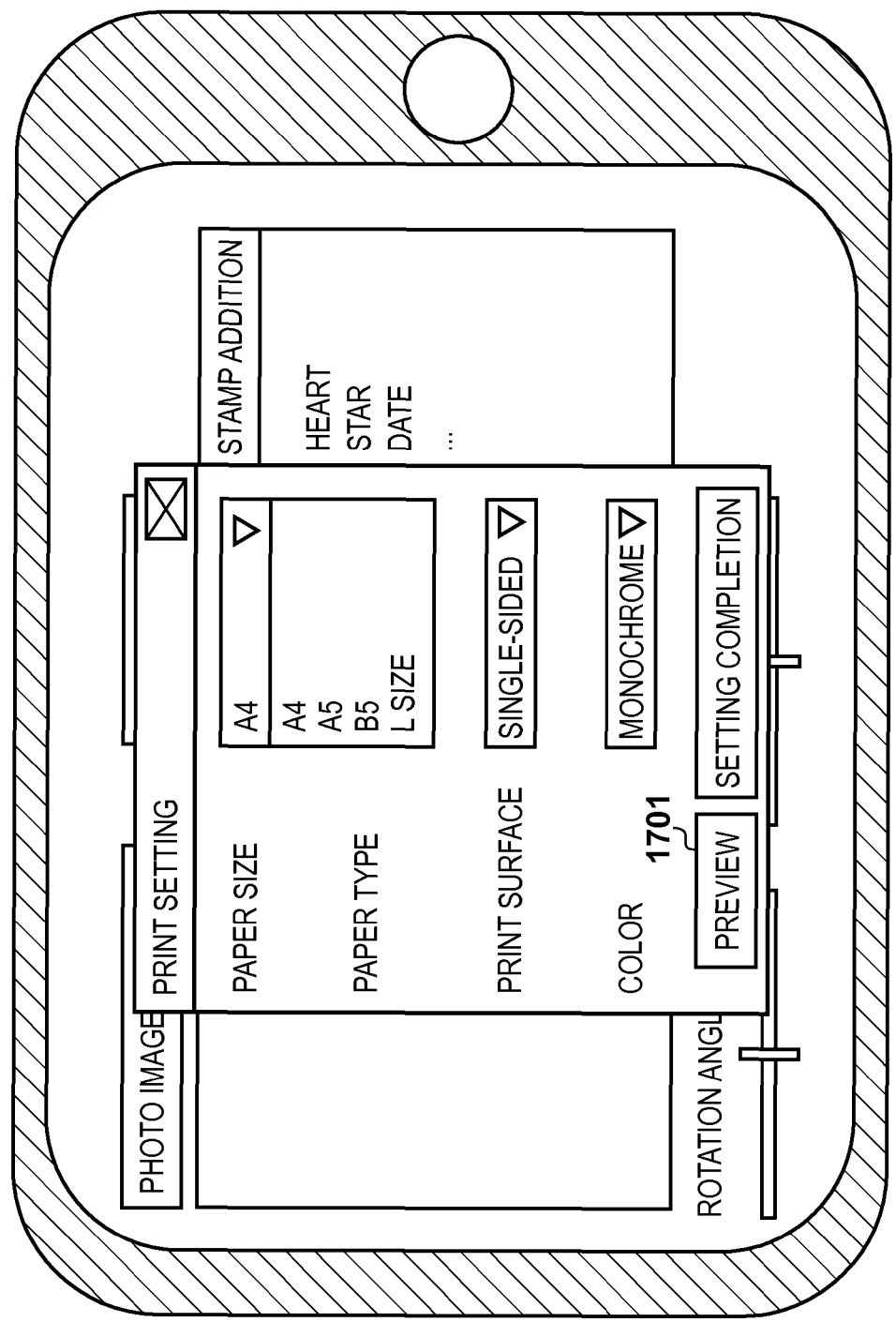
FIG. 17 is a view showing an example of a print UI.

As described with reference to FIG. 3, the user draws print content in steps S21 to S25 and then makes print settings in step S26. However, a print preview can be displayed from a UI setting screen as shown in FIG. 17. As shown in FIG. 17, this setting screen is provided with a preview button 1701. When the user presses or touches the button in the setting screen, print content information drawn in a script layer 217 and print setting information such as paper selected by the user are input to the script layer 217, and rendering for printing is executed.

Figure 18:
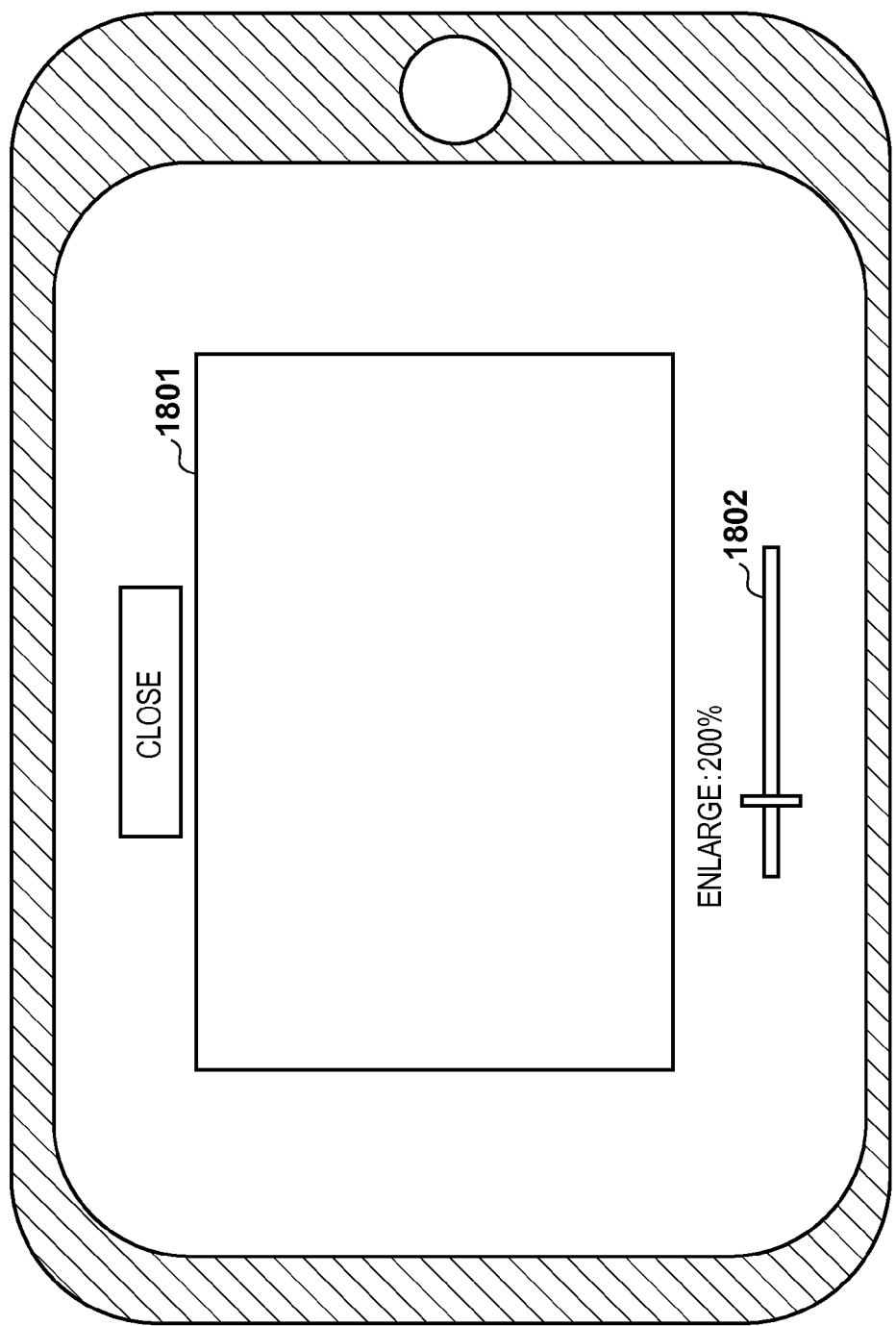
FIG. 18 is a view showing an example of a preview UI.

A result obtained by the rendering for printing is converted into base64 text data and transferred to the script layer 217. As a result, a print preview is displayed on a preview screen as shown in FIG. 18. The preview screen shown in FIG. 18 includes an area (preview area) 1801 to draw the rendering result and a slide bar 1802 capable of instructing enlargement of the displayed contents.

Hence, with the above-described arrangement, rendering for printing and rendering for print preview can be done using the same interpreter. This arrangement can avoid the problem of a mismatch between a printing result and a print preview caused by a small difference between the interpreters depending on the characteristic of print content, as compared to a case where the interpreter that executes rendering for printing and the interpreter that executes rendering for print preview are separately provided. Note that in the present application, printing and display have been described as examples of output processing. Transmission processing may be executed as another output processing.

The example of the information processing apparatus shown in FIG. 1 is hardware assuming a portable mobile computer. However, the present invention is not limited to this. For example, the same arrangement as described above can be implemented on hardware such as a desktop type personal computer or game machine.

In addition, as the printer according to each of the aforementioned embodiments, an inkjet printer, a laser printer, a dye-sublimation printer, a dot impact printer, or the like can be used. These printers may be so-called multi-function peripherals having not a single function but the printer function, the scanner function, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-122750, filed Jun. 13, 2014, which is hereby incorporated by reference herein in its entirety.

What is claimed is:

1. An information processing apparatus in which an operating system is operable and which includes a program including (i) a first program layer with an instruction set described in a first program language and (ii) a second program layer with an instruction set described in a second program language different from the first program language, the information processing apparatus comprising:
   a first interpretation unit configured to execute an interpretation process for output content to perform a first output process;
   a second interpretation unit configured to execute the interpretation process for the output content to perform a second output process; and
   a communication unit configured to perform communication, via the second program layer, between the first program layer and a printer,
   wherein said second interpretation unit is provided in the second program layer, wherein data is handled as text data in the first program layer, wherein data is handled as a binary data in the second program layer, wherein the output content is to be printed by the printer is described in the first program layer, wherein, as the first output process, said first interpretation unit performs interpretation to display the output content on a screen, and wherein, as the second output process, said second interpretation unit performs rendering to output the output content to the printer as image data.

2. The information processing apparatus according to claim 1, wherein said communication unit obtains resolution information from the printer, and wherein said second interpretation unit calculates a resolution of rendering using the obtained resolution information, reserves, in a memory, an area to store the image data according to the resolution of rendering, and draws the output content in the area.

3. The information processing apparatus according to claim 2, wherein said second interpretation unit further generates preview data to be preview-displayed on the screen before the rendered image data is output to the printer.

4. The information processing apparatus according to claim 3, further comprising a conversion unit configured to convert the image data based on the output content rendered by said second interpretation unit into a format interpretable by the printer, wherein said communication unit transmits a result of conversion of said conversion unit to the printer.

5. The information processing apparatus according to claim 1, wherein the output content is described using Canvas.

6. The information processing apparatus according to claim 1, wherein the output content is described using SVG.

7. The information processing apparatus according to claim 1, wherein the operating system is an Android® OS, and wherein a Java layer is provided between the operating system and the first program layer.

8. The information processing apparatus according to claim 1, wherein the information about the printer is held in at least one of the printer, an external apparatus connected to the information processing apparatus via a network, and the second program layer.

9. The information processing apparatus according to claim 1, wherein the first program language is one of HTML5 and JavaScript®.

10. An information processing method of causing a processor, by which an operating system is operable, to execute a program including (i) a first program layer with an instruction set described in a first program language and (ii) a second program layer with an instruction set described in a second program language different from the first program language, the information processing method comprising:

executing a first interpretation process for output content to perform a first output process;

executing, in the second program layer, a second interpretation process for the output content to perform a second output process; and performing communication, via the second program layer, between the first program layer and a printer, wherein data is handled as text data in the first program layer, wherein data is handled as binary data in the second program layer, wherein the output content to be printed by the printer is described in the first program layer, wherein the first interpretation process to display the output content on a screen is performed in the operating system as the first output process, and wherein rendering to output the output content to the printer as image data is performed in the second program layer as the second output process.

11. The information processing method according to claim 10, wherein in the communication between the first program layer and the printer, resolution information is obtained from the printer, and wherein in the second program layer, a resolution of rendering is calculated using the obtained resolution information, an area to store the image data according to the resolution of rendering is reserved in a memory, and the output content is drawn in the area.

12. The information processing method according to claim 11, wherein in the second program layer, preview data to be preview-displayed on the screen is further generated before the rendered image data is output to the printer.

13. The information processing method according to claim 12, further comprising converting the image data based on the output content rendered in the second program layer into a format interpretable by the printer, wherein a result of the conversion is transmitted to the printer by the communication between the first program layer and the printer.

14. The information processing method according to claim 10, wherein the first program language is one of HTML5 and JavaScript®.

* * * * *